(12) United States Patent
Lee

(10) Patent No.: US 11,252,396 B2
(45) Date of Patent: Feb. 15, 2022

(54) METHOD AND APPARATUS FOR AN ADVANCED RADIO SYSTEM

(71) Applicant: Aura Intelligent Systems, Inc., Boston, MA (US)

(72) Inventor: Jungah Lee, Pittstown, NJ (US)

(73) Assignee: Aura Intelligent Systems, Inc., Boston, MA (US)

( * ) Notice: Subject to any disclaimer, the term of this patent is extended or adjusted under 35 U.S.C. 154(b) by 0 days.

(21) Appl. No.: 16/786,851

(22) Filed: Feb. 10, 2020

(65) Prior Publication Data
US 2020/0252599 A1 Aug. 6, 2020

Related U.S. Application Data

(63) Continuation of application No. 16/438,140, filed on Jun. 11, 2019, now Pat. No. 10,560,685.
(Continued)

(51) Int. Cl.
*H04N 13/254* (2018.01)
*H04N 13/275* (2018.01)
(Continued)

(52) U.S. Cl.
CPC ......... *H04N 13/254* (2018.05); *H04N 13/275* (2018.05); *G01S 13/42* (2013.01); *G01S 13/89* (2013.01)

(58) Field of Classification Search
CPC ....... H04L 5/0007; H04L 5/003; H04L 27/26; H04L 27/2634; H04L 27/2637;
(Continued)

(56) References Cited

U.S. PATENT DOCUMENTS 8,570,210 B1 10/2013 Fonder et al.
9,184,794 B1 * 11/2015 Ibrahim ................ H04L 5/0023
(Continued)

OTHER PUBLICATIONS

International Search Report and Written Opinion of the International Searching Authority in connection with International Application No. PCT/US2020/013572 dated Feb. 18, 2020, 6 pages.
(Continued)

*Primary Examiner* — Young T. Tse

(57) ABSTRACT

An advanced communication system is provided. The advanced communication system comprises generating a first signal with a polyphase coding based on a DFT spread OFDM with at least one CAZAC sequence in accordance with a configuration condition, applying a digital transmit beamforming to the generated first signal, converting the first signal to analog from digital, modulating the converted first signal with an energy source, emitting, using at least one energy emit element, the modulated first signal, detecting a second signal comprising at least a portion of the emitted first signal that is reflected from at least one object in a scene in a field-of-view, demodulating the detected second signal, converting the second signal to digital from analog, converting the converted second signal to a computational image, and generating a 3D image by applying coherent detection to the computational image. The first signal comprises a polyphase sequence.

18 Claims, 7 Drawing Sheets

Related U.S. Application Data

(60) Provisional application No. 62/683,655, filed on Jun. 12, 2018, provisional application No. 62/792,354, filed on Jan. 14, 2019, provisional application No. 62/838,168, filed on Apr. 24, 2019.

(51) Int. Cl.
*G01S 13/89* (2006.01)
*G01S 13/42* (2006.01)

(58) Field of Classification Search
CPC .............. H04L 27/265; H04L 27/2666; H04L 27/2697; H04N 13/207; H04N 13/254; H04N 13/275; G01S 13/42; G01S 13/89
USPC ........ 375/260, 262, 265, 267; 370/208, 210, 370/355, 342; 382/154, 250, 278, 280, 382/285
See application file for complete search history.

(56) References Cited

U.S. PATENT DOCUMENTS

| | | | |
|---|---|---|---|
| 9,687,210 B2* | 6/2017 | Prater | .................... A61B 8/145 |
| 2004/0141548 A1 | 7/2004 | Shattil | |
| 2007/0165588 A1 | 7/2007 | McCoy | |
| 2007/0171995 A1 | 7/2007 | Muharemovic et al. | |
| 2007/0230600 A1 | 10/2007 | Bertrand et al. | |
| 2008/0075195 A1 | 3/2008 | Pajukoski et al. | |
| 2009/0036772 A1 | 2/2009 | Lu | |
| 2009/0219802 A1 | 9/2009 | Han et al. | |
| 2010/0046667 A1* | 2/2010 | Tsutsui | ................... H01Q 1/246 375/296 |
| 2011/0064069 A1 | 3/2011 | Lipka | |
| 2011/0249548 A1 | 10/2011 | Gaal et al. | |
| 2014/0064264 A1* | 3/2014 | Morita | ................ H04J 13/0014 370/350 |
| 2014/0177554 A1 | 6/2014 | Kwak et al. | |
| 2014/0187174 A1 | 7/2014 | Safavi et al. | |
| 2014/0205035 A1 | 7/2014 | Ko et al. | |
| 2016/0116582 A1 | 4/2016 | Chang | |
| 2016/0128675 A1 | 5/2016 | Kang et al. | |
| 2017/0031004 A1 | 2/2017 | Jales et al. | |
| 2017/0150485 A1 | 5/2017 | Hampel et al. | |
| 2018/0212730 A1* | 7/2018 | Huang | .................. H04L 5/0048 |
| 2018/0231655 A1 | 8/2018 | Stark et al. | |
| 2019/0052844 A1* | 2/2019 | Droz | ..................... H04N 7/183 |
| 2019/0379882 A1 | 12/2019 | Lee | |

OTHER PUBLICATIONS

International Search Report and Written Opinion of the International Searching Authority in connection with International Application No. PCT/US2019/036770 dated Sep. 17, 2019, 6 pages.

International Search Report and Written Opinion of the International Searching Authority in connection with International Application No. PCT/US2020/029924 dated Jul. 21, 2020, 16 pages.

Long et al., "Advanced technology of high-resolution radar: target detection, tracking, imaging, and recognition", Science China Information Sciences, vol. 62, Mar. 11, 2019, 15 pages.

Notification of Transmittal of the International Search Report and the Written Opinion of the International Searching Authority, or the Declaration dated Apr. 8, 2021 in connection with International Patent Application No. PCT/US2021/070043, 7 pages.

Office Action dated Jun. 1, 2021 in connection with Japanese Patent Application No. 2020-573566, 6 pages.

* cited by examiner

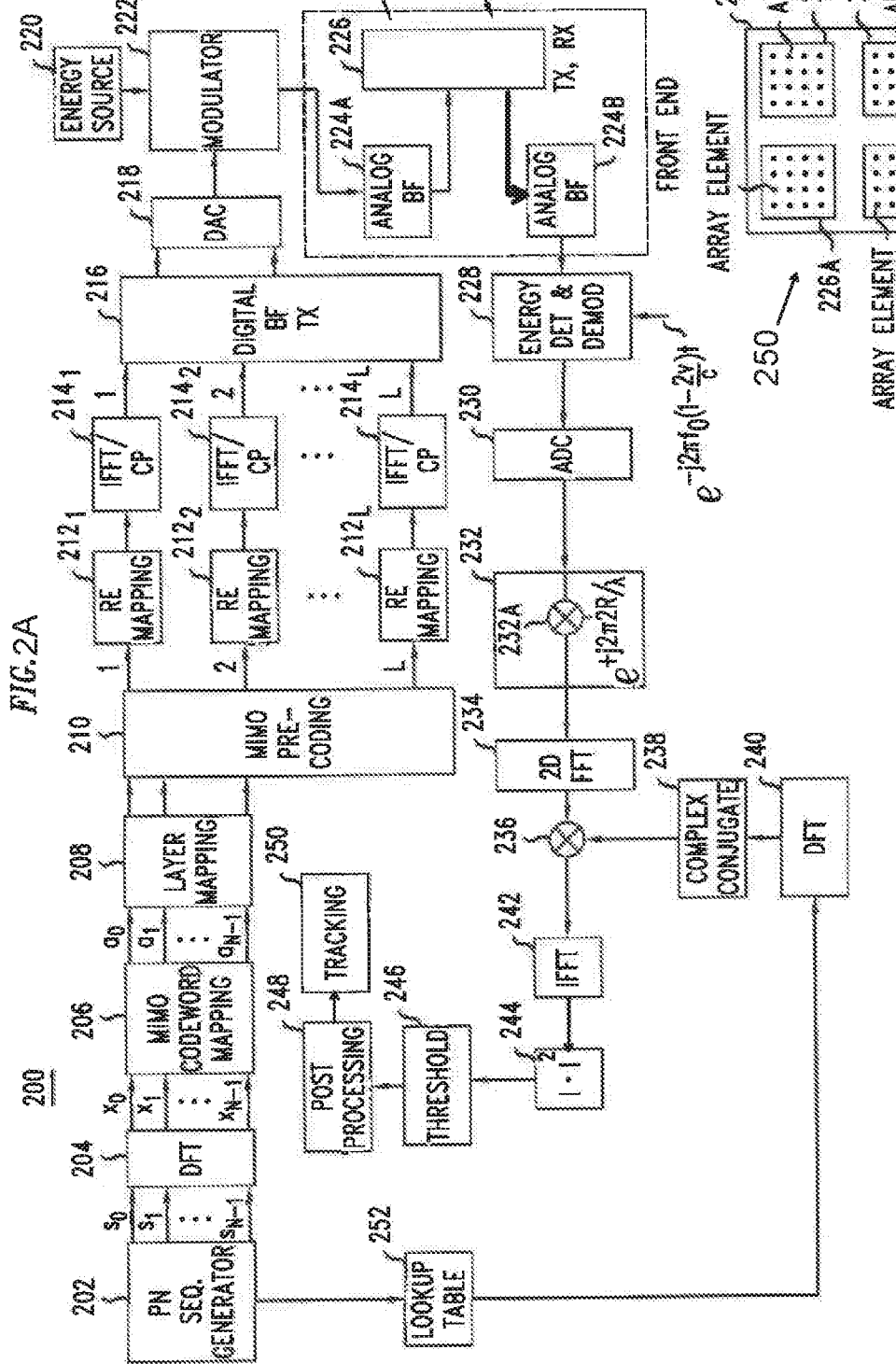
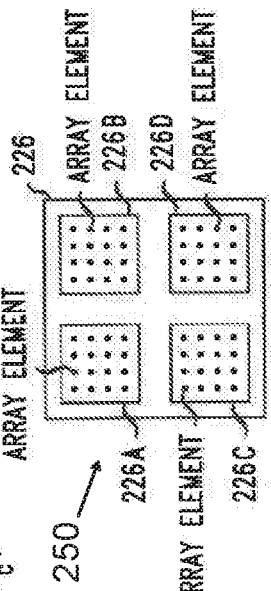
FIG. 2A
FIG. 2B

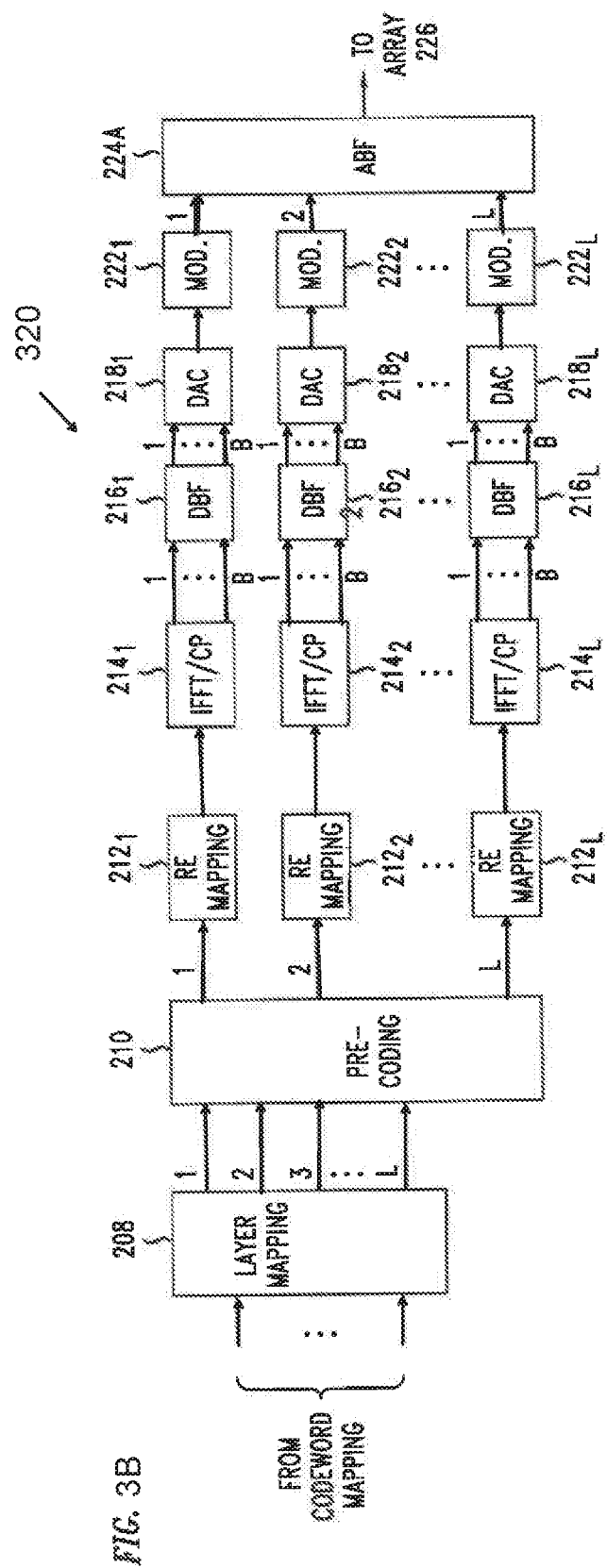
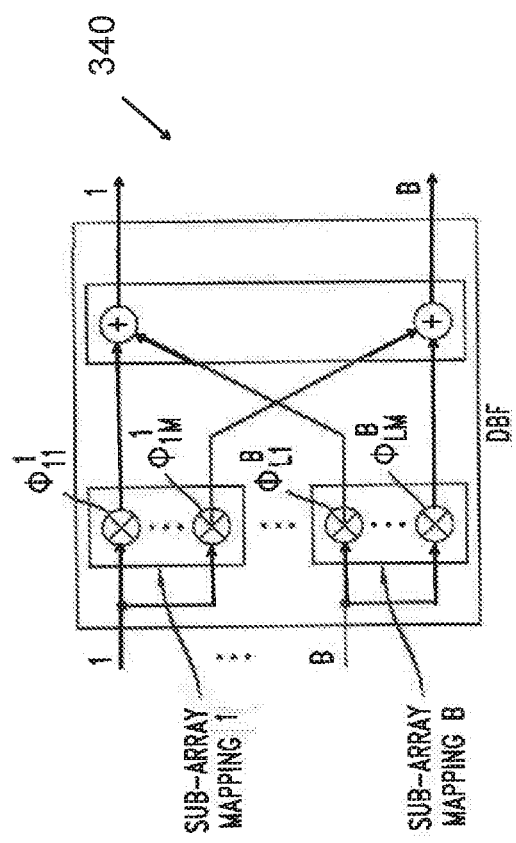
FIG. 3B
FIG. 3C

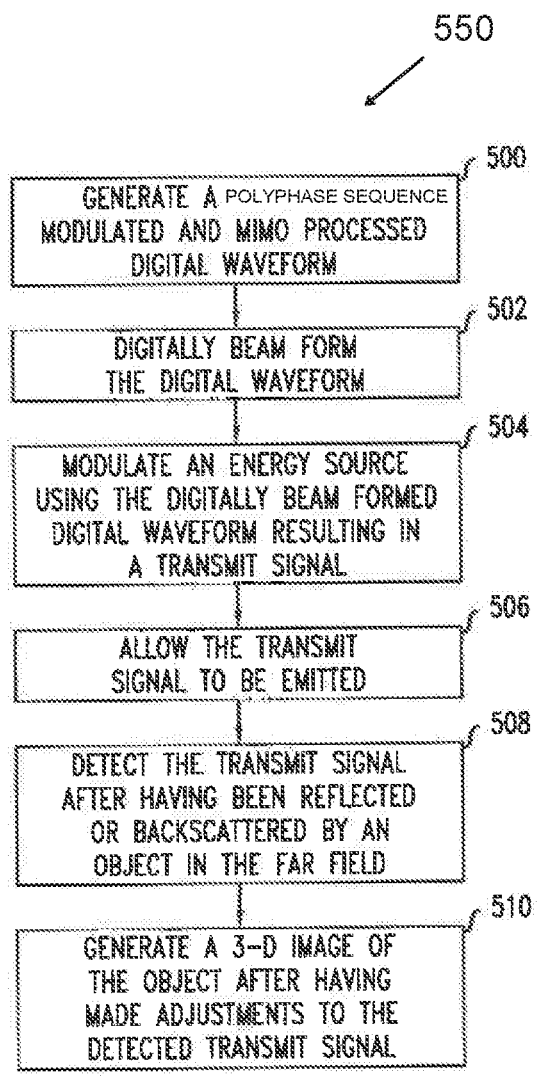

METHOD AND APPARATUS FOR AN ADVANCED RADIO SYSTEM

CROSS-REFERENCE TO RELATED APPLICATIONS AND CLAIM OF PRIORITY

This application is a continuation of U.S. patent application Ser. No. 16/438,140, filed on Jun. 11, 2019, which claims priority to:
U.S. Provisional Patent Application Ser. No. 62/683,655, filed on Jun. 12, 2018;
U.S. Provisional Patent Application Ser. No. 62/792,354, filed on Jan. 14, 2019; and
U.S. Provisional Patent Application Ser. No. 62/838,168, filed on Apr. 24, 2019. The disclosures of the above-identified patent documents are incorporated herein by reference.

TECHNICAL FIELD

The present application relates generally to an advanced radio system. More specifically, this disclosure relates to a sensor system for 3D imaging applications and a radio system.

BACKGROUND

Sensor technology for 3D (3 dimensional) imaging is associated with 3D imaging sensors that sense 3D objects and process resulting information from the sensing of the 3D objects. In recent times, the requirements by certain applications for 3D imaging sensors to process imaging information under difficult circumstances are relatively more common than in previous years and such sensors are increasingly becoming more challenging to design and manufacture. One example of a difficult circumstance is that in certain applications of 3D imaging sensors, the sensor may be moving at a high-speed relative to the object being sensed. Another example is the location of the sensor relative to the position of the object that is to be sensed. The sensor may need to detect multiple objects where some of the objects are partially obscured by other undesired objects. Further, the sensor may be located at a relatively large distance from the object being sensed and consequently the information resulting from sensing such a relatively distant object is often lacking or incomplete.

SUMMARY

The present disclosure is a 3D imaging sensor that generates a 3D image of a scene within a field of view (FoV). The 3D imaging sensor generates a transmit signal that is reflected or backscattered by various objects of the scene. The backscattered or reflected signal is received and processed by the 3D imaging sensor to generate the 3D image of the scene comprising objects and structures in a field with respect to the 3D imaging sensor. The 3D imaging sensor uses computational imaging comprising an image formation algorithm to generate the 3D image of the scene.

In one embodiment, an advanced communication system is provided. The advanced communication system comprises a processor, and a three dimensional (3D) imaging sensor operably connected to the processor, the 3D imaging sensor comprising a digital imaging circuit configured to generate a first signal with a polyphase coding based on a discrete Fourier transform (DFT) spread orthogonal frequency division multiplexing (OFDM) with at least one constant amplitude zero autocorrelation (CAZAC) sequence in accordance with a configuration condition, and apply a digital transmit beamforming to the generated first signal. The first signal comprises a polyphase sequence. The advanced communication system further comprises a transceiver (XCVR) operably connected to the digital imaging circuit, the XCVR configured to convert the first signal to analog from digital and modulate the converted first signal with an energy source. The advanced radio system further comprises an array operably connected to the processor and the XCVR, the array configured to emit, using at least one energy emit element, the modulated first signal, detect a second signal comprising at least a portion of the emitted first signal that is reflected from at least one object in a scene in a field-of-view, demodulate the detected second signal, and convert the second signal to digital from analog. The digital imaging circuit is further configured to convert the converted second signal to a computational image and generate a 3D image by applying coherent detection to the computational image.

In another embodiment, a method of an advanced communication system is provided. The method comprises generating a first signal with a polyphase coding based on a discrete Fourier transform (DFT) spread orthogonal frequency division multiplexing (OFDM) with at least one constant amplitude zero autocorrelation (CAZAC) sequence in accordance with a configuration condition, wherein the first signal comprises a polyphase sequence, applying a digital transmit beamforming to the generated first signal, converting the first signal to analog from digital, modulating the converted first signal with an energy source, emitting, using at least one energy emit element, the modulated first signal, detecting a second signal comprising at least a portion of the emitted first signal that is reflected from at least one object in a scene in a field-of-view, demodulating the detected second signal, converting the second signal to digital from analog, converting the converted second signal to a computational image, and generating a 3D image by applying coherent detection to the computational image.

In yet another embodiment, a non-transitory computer-readable medium is provided. The non-transitory computer-readable medium comprises program code, that when executed by at least one processor, causes an electronic device to generate a first signal with a polyphase coding based on a discrete Fourier transform (DFT) spread orthogonal frequency division multiplexing (OFDM) with at least one constant amplitude zero autocorrelation (CAZAC) sequence in accordance with a configuration condition, wherein the first signal comprises a polyphase sequence, apply a digital transmit beamforming to the generated first signal, convert the first signal to analog from digital, modulate the converted first signal with an energy source, emit, using at least one energy emit element, the modulated first signal, detect a second signal comprising at least a portion of the emitted first signal that is reflected from at least one object in a scene in a field-of-view, demodulate the detected second signal, convert the second signal to digital from analog, convert the converted second signal to a computational image, and generate a 3D image by applying coherent detection to the computational image.

In yet another embodiment, the 3D imaging sensor comprises a digital imaging circuit coupled to a transceiver (XCVR) circuit, which is coupled to an array wherein said array has one or more energy emitter elements and one or more energy detector elements. In such embodiment, the array is a 2D array with each array element (energy emitter or energy detector elements) having an (x, y) coordinate defining the position of each such array element.

The 3D imaging sensor has a transmit path starting from the digital imaging circuit extending through the transceiver circuit to the array, and a receive path starting at the array extending through the transceiver circuit to the digital imaging module.

The 3D imaging sensor generates a transmit signal that is emitted by one or more energy emitter elements of the array. The 3D imaging sensor detects the emitted transmit signals reflected or backscattered from objects, structures, or items of a scene that are within the field of view (FoV) of the 3D imaging sensor allowing to generate 3D images of the scene using digital beam forming operations and one or more image formation algorithms. Objects, structures, or other items, which reflect energy transmitted by the 3D imaging sensor are said to be illuminated.

The objects within the FoV of the 3D imaging sensor and from which the transmit signal is reflected are thus illuminated by the 3D imaging sensor of the present disclosure. The FoV is a portion of space within which an object is located so that the FoV can be illuminated by the 3D imaging sensor of the present disclosure. Objects within the FoV may, however, be obscured by other objects in the FoV. The scene comprises objects, structures and other items that can be illuminated by the 3D imaging sensor.

In this embodiment of the present disclosure, the transmit path within the digital imaging module comprises a sequence generator for generating pseudo noise (PN) sequences, a waveform generator for generating orthogonal digital waveforms and a digital transmit beam former for performing digital beam forming operations on PN-sequence-modulated orthogonal digital waveforms.

The transmit path continues in the transceiver (XCVR) circuit, which comprises a digital to analog converter (DAC) circuit, and a modulator having a first input coupled to an energy source, a second input for receiving an analog signal generated from the DAC wherein said analog signal comprises the digitally beam formed PN sequence modulated orthogonal digital waveform converted to an analog signal by the DAC.

The modulator further has an output providing a transmit signal that is coupled to one or more energy emitter elements of the array. Thus, the transmit signal is the energy from the energy source being modulated by the analog signal from the DAC. The transmit signal emitted by an array of the 3D imaging sensor of the present disclosure is caused to illuminate a scene, viz., objects, structures or other items in the FoV of the 3D imaging sensor of the present disclosure. The transmit signals that are caused to illuminate a scene experience a resultant phase shift due to frequency translation, time delays and various other phase shifts.

Further, in this embodiment of the present disclosure, the receive path of the transceiver comprises an energy detector circuit configured to receive energy detected by one or more energy detector elements of the array. In particular, the receive path detects energy transmitted from the transmit path (i.e., the transmit signal) that is reflected (or backscattered) from an illuminated scene (i.e., objects, structures or items) in the FoV of the 3D imaging sensor of the present disclosure.

The energy detector circuit is coupled to energy detector elements of the array. The output of the energy detector circuit is coupled to a demodulator (not shown) whose purpose is to obtain a baseband signal from the received reflected signal. It will be readily understood that the operations of energy detection and demodulation may be performed in one circuit and/or module, one set of circuits, or may be implemented as two separate modules or circuits.

The output of the demodulator provides the received baseband signal. Thus, the received baseband signal is applied to an analog to digital converter (ADC) for providing a received digital signal. The receive path continues to the digital imaging circuit, which comprises a computational imaging circuit coupled to a coherent detector (i.e., a correlation detector) to process the received digital signal to generate 3D images of a scene (i.e., objects, structures and other items) being illuminated by the 3D imaging sensor of the present disclosure.

The computational imaging circuit, performs at least an image formation algorithm that reduces or substantially eliminates the resultant phase shift experienced by the emitted transmit signals backscattered or reflected from a scene being illuminated by the 3D imaging sensor, and generates a 3D image of the scene through the use of a 2D fast Fourier transform (FFT).

As explained above, these reflected or backscattered transmit signals are thus finally received by the energy detector elements of the array of the 3D imaging sensor. These received signals experience a resultant phase shift due to frequency shifts (or Doppler shifts), time delays, and various phase shifts due to interaction with the objects, structures or other items of the scene. The resultant phase shift is also a result of the relative speed between the scene being illuminated and the array.

Also, the type of reflections and backscattering experienced by these signals at various target points of objects, structures, or other items may be due to environmental conditions and the relative smoothness of the surface of the targets of objects and structures of a scene being illuminated. All or some of these aforementioned factors may contribute to the resultant phase shift experienced by the transmit signal that is reflected from a scene received by one or more energy detector elements of the array of the 3D imaging sensor of the present disclosure.

The digital imaging circuit performs computational imaging operations such as an image formation algorithm to determine the target reflectivity, which is the fraction of a signal (e.g., electromagnetic or optical signal incident to the target) that is reflected from the target. The digital imaging circuit thus uses the image formation algorithm to calculate voxels (volume pixel) having coordinates (x, y, r) to generate a 3D image of a scene being illuminated by the 3D imaging sensor of the present disclosure. The (x, y, r) coordinates are calculated using a 2-D fast Fourier transform of the reflectivity density p, which is the reflected or backscattered signal (from a target point of an object) per infinitesimal volume $d\zeta d\eta dr$. The reflectivity density of the target is thus be modeled as a function of the three variables, ($\zeta$, $\eta$, r) as will be discussed below. The image formation algorithm also makes adjustments to the resultant phase shift experienced by the transmit signals reflected or backscattered by objects, structures, or other items of a scene. The adjustments reduce or significantly eliminate the resultant phase shift experienced by the transmit signals after the transmit signals were emitted by an energy emitting element of the array, to a scene, and reflected or backscattered by the scene. The reflected or backscattered transmit signals are then received by one or more energy detector elements of the array.

A value for the coordinate r associated for each (x, y) set of coordinates is also calculated by the image formation algorithm by performing a 2D FFT of the reflectivity density of a target point from which a transmitted signal by the 3D imaging sensor is reflected. Thus, for each value of r calculated, i.e., $r=R_1, R_2, R_3, \ldots, R_N$, for a particular (x, y) coordinate, there is a corresponding voxel (x, y, $R_1$), (x, y, $R_2$), (x, y, $R_3$), ... (x, y, $R_N$) that can be computed by the 3D imaging sensor of the present disclosure thus generating a 3D image of a scene. The coordinate r represents a distance (or a range) between the corresponding energy detector element (element detecting the reflected transmit signal) having coordinates (x, y) and a target point of a scene being illuminated by the transmit signals emitted by the array.

The transmitted signal is reflected (or backscattered) by the target point and is then detected by one or more energy detector elements of the array having a coordinate of (x, y). For that particular set of coordinates, the 3D imaging sensor of the present disclosure calculates the r value for different values of r ($r=R_1, r=R_2, r=R_3, \ldots, r=R_N$), in the process of generating a 3D image of the scene being illuminated. The resulting voxels thus have coordinates (x, y, $R_1$), (x, y, $R_2$), (x, y, $R_3$), ..., (x, y, $R_N$) where N is an integer equal to 1 or greater.

In another embodiment, the transmit signal comprises a digitally beam formed orthogonal digital waveform modulated by a multiple input multiple output (MIMO) processed frequency domain PN sequence, said digitally beam formed orthogonal digital waveform is converted to an analog waveform signal caused to modulate an energy source resulting in a modulated signal that is then analog beam formed to obtain the transmit signal applied to the one or more energy emitter elements of the array. The operation of analog beam forming comprises applying a signal directly to an element of the array to provide a certain phase value to the element. The phase of that element does not change until the signal (e.g., voltage, current) is no longer applied.

Continuing with this embodiment, the receiver is configured to detect energy received by the energy detector elements of the array and demodulate the received signals to derive the baseband signal from the received signals. The receiver is further configured to perform operations comprising computational imaging on a received digital signal to generate one or more 3D images of objects, structures or an overall scene from which the transmit signals are reflected. The objects, structures, or other items of the scene are located in the with respect to the array.

The computational imaging comprises at least an image formation algorithm for making adjustments to the resultant phase shift experienced by the reflected or backscattered transmitted signal received by one or more energy detector elements of the array. The image formation algorithm also provides for generating a 3D image of the received reflected or backscattered signal through the use of a 2D FFT operation performed on the received signal. In particular, the received transmitted signal is detected and the baseband signal is retrieved through demodulation. The baseband signal is then converted to a digital signal (i.e., a received digital signal) with the use of an analog to digital converter.

Operations on the received digital signal—comprising phase adjustment and a 2-D FFT—are then performed to generate 3D images of objects located in a wherein such objects are within the FoV of the 3D imaging sensor of the present disclosure. The 3D image is thus based on locations of objects, structures or other items in a scene being illuminated by the 3D imaging sensor of the present disclosure. Clearly, each target location does not necessarily have the same distance.

The distance between an energy detector element of the array and a target location may change and most often does for different target locations. For example, the distance may be R for a first target location, then changes to $R_1$ for another location and then $R_2$ for yet another location. The coordinates (x, y) (of the energy detection array element) and calculated (r) coordinate result in (x, y, r) coordinates representing voxels (volume pixels) of a 3D image of a target of an object being illuminated by the transmit signal from the 3D imaging sensor of the present disclosure.

In yet another embodiment, the 3D imaging sensor is provided access to transmit signals generated by a wireless communication system and uses said signals to illuminate a scene to obtain or generate a 3D image of the scene. In this embodiment, signals such as a random-access channel (RACH), synch signals, and pilot signals may be used, for example individually or in various combinations, as a transmit signal to illuminate the scene.

Thus, devices such as small cells that are part of a wireless communication system may be equipped with a 3D imaging sensor of the present disclosure and such small cells can provide their transmit signals to the 3D imaging sensor. The sensor can then use such signals as the sensor's transmit signals thus allowing the sensor to illuminate an object using a transmit signal in which the sensor did not generate, but is able to use such a signal knowing the characteristics (e.g., frequencies, amplitude, modulation) of the transmit signal.

Accordingly, the 3D imaging sensor can use said transmit signals to illuminate a scene and obtain or generate 3D images of the scene. Such cells equipped with a 3D imaging sensor of the present disclosure can thus be used, for example, as security or monitoring cameras for various purposes.

In yet another embodiment, the 3D imaging sensor is provided access to transmit signals from a television broadcast signal transmitter and the television broadcast signal is used to illuminate a scene to obtain or generate a 3D image of the scene. In such embodiment, signals such as synch signals, pilot signals, reference signals, or preambles of communication channels and other well-known television broadcast signals may be used individually or in various combinations as a transmit signal to illuminate the scene.

Thus, devices such as transmit antenna towers that are part of a television broadcast system may be equipped with a 3D imaging sensor of the present disclosure and such equipment can provide their transmit signals to the 3D imaging sensor. The 3D imaging sensor can then use such signals as the 3D imaging sensor's transmit signals thus allowing the sensor to illuminate an object using a transmit signal in which the sensor did not generate, but is able to use such a signal knowing the characteristics (e.g., frequencies, amplitude, modulation) of the transmit signal.

Accordingly, the 3D imaging sensor can use said transmit signals to illuminate a scene and obtain or generate 3D images of the scene. Such TV broadcast equipment with a 3D imaging sensor of the present disclosure can thus be used, for example, as security or monitoring cameras for various purposes.

In yet another embodiment, the 3D imaging sensor is provided access to transmit signals generated by any wireless or wireline system wherein (i) the 3D imaging sensor has access to transmit signals of these systems; and (ii) the particular characteristics of the signaling associated with the transmit signals are usable by the 3D imaging sensor of the present disclosure to illuminate scenes in the field-of-view and generate 3D images of the scenes or the objects and structures thereof.

The 3D imaging sensor can then use such signals as the 3D imaging sensor's transmit signals thus allowing the sensor to illuminate an object using a transmit signal in which the sensor did not generate, but is able to use such a signal as it is able to adjust or otherwise manipulate various characteristics of the transmit signal from the wireline or wireless source. Accordingly, the 3D imaging sensor can use said transmit signals to illuminate a scene and obtain or generate 3D images of the scene using the image formation algorithm as has been discussed supra.

In yet another embodiment, the array of the 3D imaging sensor of the present disclosure is a 1D array with software-controlled beam steering either horizontally or vertically (or both) to define (x, y) coordinates of a virtual 2D array. The 1D array is steerable in horizontal or vertical directions to position elements of the 1D array to x, y coordinates of a virtual 2D array. Such a steerable 1-D array is thus operable as a virtual 2-D array.

In yet another embodiment, the array of the 3D imaging sensor of the present disclosure is a 2D array.

In yet another embodiment, the array of the 3D imaging sensor of the present disclosure is a 2D array comprising a plurality of sub-Arrays of energy emitter elements and energy detector elements.

In yet another embodiment, the array of the 3D imaging sensor of the present disclosure comprises a transmit array and a Receive array.

In yet another embodiment where the array is a transmit array and a receive array, the two arrays are located in known positions relative to each other.

In yet another embodiment, the present disclosure further comprises a processor for controlling, operating or directing the operation of the transmitter, receiver and array of the 3D imaging sensor of the present disclosure.

In yet another embodiment, the processor comprises a plurality of processors in communication with each other.

In yet another embodiment, the processor comprises a plurality of processors performing parallel processing.

In yet another embodiment, the processor is a main processor in control of a plurality of controllers and processors.

In yet another embodiment, the plurality of processors and controllers are microprocessors and microcontrollers respectively.

In yet another embodiment, the processor comprises microprocessors and digital signal processors (DSP).

In yet another embodiment, the array is configured to emit or detect optical signals in the wavelength range of 700 nm to 1400 nm inclusive belonging to near infrared (NIR), and 1400 nm to 3000 nm inclusive belonging to short-wave Infrared (SWIR).

In yet another embodiment, the array is configured to emit or detect electromagnetic signals in one of an HF region, a VHF region, UHF, SHF, EHF and a THz region. The EHF region is particularly suited for simultaneous broadband communications and high-resolution imaging.

In yet another embodiment, the transmitter includes a modulator having an output, a first input, and a second input, where said first input is coupled to an energy source modulated by the waveform signal applied to the second input of the modulator.

In yet another embodiment, the modulator is one of a BPSK, QPSK, OOK, ASK, FSK, PPM, PSK, and DPSK modulator.

In yet another embodiment, the output of the modulator is coupled to a transmitter analog beam former resulting in the transmit signal.

In yet another embodiment, the transmitter comprises a digital to analog converter (DAC) circuit configured to receive the digitally beam formed orthogonal digital waveform and converting said waveform to an analog waveform signal applied to an input of the modulator.

In yet another embodiment, the transmitter comprises a time domain PN sequence generator coupled to a transformation circuit having an output and configured to convert a transmitter generated time domain PN sequence to a frequency domain PN sequence, the output of said transformation circuit being further coupled to MIMO processing circuitry resulting in a MIMO processed frequency domain PN sequence applied to a digital beam former circuit to generate a digitally beam formed MIMO processed frequency domain PN sequence.

In yet another embodiment, the transmitter comprises a time domain PN sequence generator coupled to a transformation circuit having an output and configured to convert a transmitter generated time domain PN sequence to a frequency domain PN sequence, the output of said transformation circuit being further coupled to MIMO processing circuitry resulting in the MIMO processed frequency domain PN sequence applied to an orthogonal digital waveform generator (also referred to herein as an orthogonal sequence generator) having an output coupled to a digital beam former circuit to generate the digitally beam formed orthogonal digital waveform.

In yet another embodiment, the PN sequence generator is a CAZAC sequence generator.

In yet another embodiment, the CAZAC sequence generator is configured to generate at least one beacon sequence comprising a cyclic prefix (CP) sequence concatenated to one of (i) one CAZAC sequence followed by a guard time (GT); (ii) two CAZAC sequences followed by a guard time (GT) and (iii) three CAZAC sequences followed by a guard time (GT). In such embodiment, the guard time may be added as an optional time span to generate the CAZAC sequence.

In yet another embodiment, the PN sequence generator is a binary sequence such as an M-sequence generator.

In yet another embodiment, the transformation circuit is a DFT circuit.

In yet another embodiment, the MIMO processing circuitry comprises a code word mapping circuit configured to receive the frequency domain PN sequence from the Transformation circuit, said code word mapping circuit being coupled to a layer mapping circuit which is coupled to a pre-coding circuit to generate at least one frequency domain PN sequence modulated and MIMO processed digital waveform.

In yet another embodiment, the pre-coding circuit applies the at least one frequency domain PN sequence modulated and MIMO processed digital waveform to a digital beam former circuit to generate a digitally beam formed PN sequence waveform.

In yet another embodiment, the pre-coding circuit applies the at least one frequency PN sequence modulated and MIMO processed digital waveform to said orthogonal sequence generator resulting in an orthogonal digital waveform applied to the digital beam former circuit to generate the digitally beam formed orthogonal waveform.

In yet another embodiment, the orthogonal sequence generator is an orthogonal frequency division multiplex (OFDM) digital waveform generator.

In yet another embodiment the orthogonal sequence generator is a CP-less OFDM digital waveform generator.

In yet another embodiment, the orthogonal sequence generator is a filter bank multi-carrier (FBMC) digital waveform generator.

In yet another embodiment, the orthogonal sequence generator is a generalized frequency division multiplexing (GFDM) digital waveform generator.

In yet another embodiment, the orthogonal sequence generator is a resource spread multiple access (RSMA) digital waveform generator.

In yet another embodiment, the OFDM waveform generator comprises at least one resource element circuit coupled to an inverse fast Fourier transform/cyclic prefix (IFFT/CP) circuit.

In yet another embodiment, the process performed by the receiver on the received reflected transmit signal detected by the one or more energy detector elements of the array comprises analog beam forming operations on the reflected transmit signals received directly from the one or more energy detector elements of the array resulting in an analog received signal, where said analog received signal is applied to an energy detector circuit whose output is applied to an analog to digital converter (ADC) resulting in the received digital signal.

In yet another embodiment, a computational imaging circuit coupled to a 2D FFT circuit perform phase adjustments and generate 3D images of objects thereby resulting in a processed received digital signal at the output of the 2D FFT circuit, which is a frequency domain received digital signal for performing a frequency domain correlation operation between said frequency domain received digital signal and a frequency domain PN sequence that is based on the transmitter generated time domain PN sequence.

In yet another embodiment, the receiver further comprises a correlator for processing the output of the 2D FFT circuit.

In yet another embodiment the correlator determines r or determines r equaling a certain value R.

In yet another embodiment, the correlator comprises a multiplier having a first input coupled to the output of the 2D fast Fourier transform (FFT) circuit, a second input coupled to a complex conjugate circuit, and an output coupled to an inverse fast Fourier transform (IFFT) circuit whose output is used to calculate a magnitude or squared magnitude of the received signal to calculate or determine the range r=R, which is the distance between the 3D imaging sensor of the present disclosure and the location of a target of an object in the scene that is being illuminated by the 3D imaging sensor.

In yet another embodiment, the complex conjugate circuit has an output coupled to the second input of the multiplier, an input coupled to an output of a discrete Fourier transform (DFT) circuit whose input is coupled to a lookup table containing the time domain PN sequences generated by the transmitter.

In yet another embodiment, the IFFT circuit has an output applied to a signal magnitude circuit configured to compute a magnitude or a squared magnitude of the received signal where said computed received signal is applied to a threshold detector to determine amplitude (r=R; i.e., range) estimates of the received signal.

In yet another embodiment, the computational imaging circuit performs at least an image formation algorithm for (i) making adjustments to a resultant phase shift experienced by received transmit signals reflected from a scene and (ii) for generating 3D images of the scene by performing a 2DFFT of the reflectivity density of the scene based on the reflected signals from the 3D imaging sensor of the present disclosure.

The transmit signal experiences a resultant phase shift from the various time delays, frequency translations and phase shifts. The phase shifts, frequency shifts and time delay experienced by the reflected signal are due to various factors such as relative speed between the object being illuminated and the 3D imaging sensor, environmental conditions and the relative smoothness of the surface of the target being illuminated. Throughout this disclosure, the terms "speed" and "velocity" are used interchangeably.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates an example 3D imaging sensor according to embodiment of the present disclosure;

FIG. 2B illustrates an example front view of an array according to embodiments of the present disclosure;

FIG. 3B illustrates an example MIMO processing of a frequency domain PN sequence according to embodiments of the present disclosure;

FIG. 3C illustrates an example digital beam former circuit according to embodiments of the present disclosure;

FIG. 5 illustrates a flow chart of a method for generating 3D image of scene including objects and structures being illuminated by the 3D imaging sensor according to embodiments of the present disclosure.

DETAILED DESCRIPTION

Figure 1A:
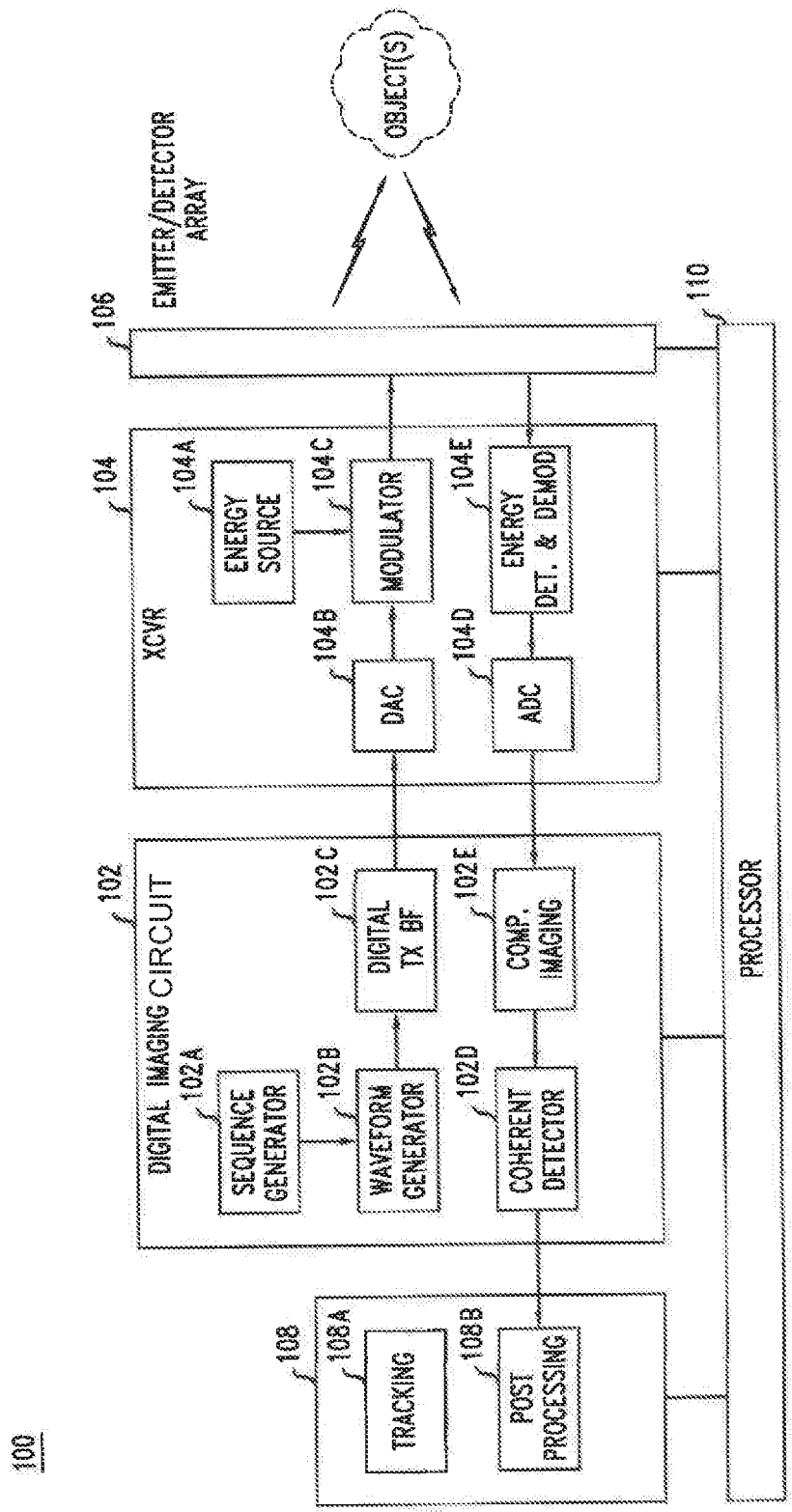
FIG. 1A illustrates an example advanced radio system including a 3D imaging sensor according to embodiments of the present disclosure.

FIG. 1A through FIG. 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present disclosure provides a 3D imaging sensor that generates a 3D image of a scene within field of view (FoV). The 3D imaging sensor generates a transmit signal that is reflected or backscattered by various objects of the scene. The backscattered or reflected signal is received and processed by the 3D imaging sensor to generate the 3D image of the scene comprising objects and structures in field-of-view with respect to the 3D imaging sensor. The 3D imaging sensor uses computational images comprising an image formation algorithm to generate the 3D image of the scene.

In one embodiment, the 3D imaging sensor comprises a digital imaging module coupled to a transceiver (XCVR) circuit, which is coupled to an array wherein said array has one or more energy emitter elements and one or more energy detector elements.

In such embodiment, the array is a 2D array with each array element (e.g., energy emitter and energy detector elements) having an (x, y) coordinate defining the position of said array element.

The 3D imaging sensor has a transmit path starting from the digital imaging module extending through a transceiver circuit to the array, and a receive path starting at the array extending through the transceiver circuit to the digital imaging circuit.

The 3D imaging sensor of the present disclosure generates a transmit signal that is emitted by one or more energy emitter elements of the array. The 3D imaging sensor detects the transmit signals reflected or backscattered from objects, structures, or items of a scene that are within the field of view (FoV) of the 3D imaging sensor allowing generating 3D images of the scene using digital beam forming operations and one or more image formation algorithms. Objects, structures, or other items, which reflect energy transmitted by the 3D imaging sensor are said to be illuminated.

The objects within the FoV of the 3D imaging sensor and from which the transmit signal is reflected are thus illuminated by the 3D imaging sensor of the present disclosure. The FoV is a portion of space within which an object, structure or item is located so that the FoV can be illuminated by the 3D imaging sensor of the present disclosure. Objects within the FoV may, however, be obscured by other objects in the FoV. The scene comprises objects, structures, and other items that can be illuminated by the 3D imaging sensor.

In the present disclosure, the transmit path within the digital imaging circuit comprises a sequence generator for generating pseudo noise (PN) sequences, a waveform generator for generating orthogonal digital waveforms and a digital transmit beam former for performing digital beam forming operations on PN-sequence-modulated orthogonal digital waveforms.

The transmit path continues in the XCVR circuit, which comprises a digital to analog converter (DAC) circuit, and a modulator having a first input coupled to an energy source, and a second input for receiving an analog signal generated from the DAC wherein said analog signal comprises the digitally beam formed PN sequence modulated orthogonal digital waveform converted to an analog signal by the DAC.

The modulator further has an output providing a transmit signal that is coupled to one or more energy emitter elements of the array. Thus, the transmit signal is the energy from the energy source being modulated by the analog signal from the DAC. The transmit signal emitted by an array of the 3D imaging sensor of the present disclosure is caused to illuminate a scene, viz., objects, structures or other items in the FoV of the 3D imaging sensor of the present disclosure. The transmit signals that are caused to illuminate a scene experience a resultant phase shift due to frequency translation, time delays, and various phase shifts.

Further, in such embodiment of the present disclosure, the receive path of the transceiver comprises an energy detector circuit configured to receive energy detected by one or more energy detector elements of the array. In particular, the receive path detects energy transmitted from the transmit path (i.e., the transmit signal) that is reflected (or backscattered) from an illuminated scene (i.e., objects, structures or items) in the FoV of the 3D imaging sensor of the present disclosure.

The energy detector circuit is coupled to energy detector elements of the array. The output of the energy detector circuit is coupled to a demodulator (not shown) whose purpose is to obtain a baseband signal from the received reflected signal.

It will be readily understood that the operations of energy detection and demodulation may be performed in one module and/or circuit, one set of circuits, or may be implemented as two separate circuits or circuits. The output of the demodulator provides the received baseband signal. Thus, the received baseband signal is applied to an analog to digital converter (ADC) for providing a received digital signal. The receive path continues to the digital imaging circuit, which comprises a computational imaging circuit coupled to a coherent detector (i.e., a correlation detector) to process the received digital signal to generate 3D images of a scene (i.e., objects, structures and other items) being illuminated by the 3D imaging sensor of the present disclosure.

The computational imaging circuit performs at least an image formation algorithm that reduces or substantially eliminates the resultant phase shift experienced by the transmit signals backscattered or reflected from a scene being illuminated by the 3D imaging sensor, and generates a 3D image of the scene through the use of a 2D fast Fourier transform (FFT) of the reflectivity density of the reflected or backscattered transmit signal.

As aforementioned above, these reflected or backscattered transmit signals are finally received by the energy detector elements of the array of the 3D imaging sensor. These received signals experience a resultant phase shift due to frequency shifts (or Doppler shifts), time delays, and various phase shifts due to interaction with the objects, structures or other items of the scene.

The resultant phase shift is also a result of the relative speed between the scene being illuminated and the array. Also, the type of reflections and backscattering experienced by these signals at various target points of objects, structures or other items may be due to environmental conditions and the relative smoothness of the surface of the targets of objects and structures of a scene being illuminated. All or some of these aforementioned factors may contribute to the resultant phase shift experienced by the transmit signal that is reflected from a scene in the field-of-view and received by one or more energy detector elements of the array of the 3D imaging sensor of the present disclosure. In the present disclosure, the terms "speed" and "velocity" are used interchangeably.

The digital imaging circuit performs computational imaging operations such as an image formation algorithm to determine the target reflectivity, which is the fraction of a signal (e.g., electromagnetic or optical signal incident to the target) that is reflected from the target. The digital imaging circuit thus uses the image formation algorithm to calculate voxels (e.g., volume pixels) having coordinates (x, y, r) to generate a 3D image of a scene being illuminated by the 3D imaging sensor of the present disclosure. The (x, y, r) coordinates are calculated using a 2D FFT of the reflectivity density p, which is the reflected or backscattered signal (from a target point of an object) per infinitesimal volume $d\eta d\eta dr$. The reflectivity density of the target is thus modeled as a function of three variables, $(\zeta, \eta, r)$ as will be discussed below.

The image formation algorithm also makes adjustments to the resultant phase shift experienced by the transmit signals reflected or backscattered by objects, structures, or other items of a scene. The adjustments reduce or significantly eliminate the resultant phase shift experienced by the transmit signals after the transmit signals were emitted by an energy emitting element of the array, to a scene, and reflected or backscattered by the scene. The reflected or backscattered transmit signals are then received by one or more energy detector elements of the array.

A value for the coordinate r associated with each (x, y) set of coordinates is also calculated by the image formation algorithm by performing a 2D FFT of the reflectivity density of a target from which a transmitted signal by the 3D imaging sensor is reflected. Thus, for each value of r calculated, i.e., $r=R_1, R_2, R_3, \ldots, r=R_N$, for a particular (x, y) coordinate, there is a corresponding voxel (x, y, $R_1$), (x, y, $R_2$), ..., (x, y, $R_N$) that can be computed by the 3D imaging sensor of the present disclosure thus generating a 3D image of a scene.

The coordinate r represents a distance between the corresponding energy detector element (element detecting the reflected transmit signal) having coordinates (x, y) and a target point of a scene being illuminated by the transmit signals emitted by the array. The transmitted signal is reflected (or backscattered) by the target point and is then detected by one or more energy detector elements of the array having a coordinate of (x, y).

For that particular set of coordinates, the 3D imaging sensor of the present disclosure calculates the r value for different values of r ($r=R_1, r=R_2, r=R_3, \ldots$) in the process of generating a 3D image of the scene being illuminated. The resulting voxels thus have coordinates (x, y, $R_1$), (x, y, $R_2$), ..., (x, y, $R_N$) where N is an integer equal to 1 or greater.

The term "couple" as used herein refers to a path (including a waveguide, optical fiber path), arrangement of media, device(s), equipment, electrical or electronic components, modules, or any combination thereof that facilitate the flow of a signal or information from one portion of the sensor to another portion of the sensor or to another portion of a system outside of the sensor. A portion can be "an origin point" and the other portion can be a "destination point." The path may be an actual physical path (e.g., electrical, electronic, optic, electromagnetic, waveguide path) or may be a logical path implemented through a data structure that allows information stored at certain memory locations to be retrieved by direct or indirect addressing.

A "direct couple" between two points, or points that are "directly coupled" to each other means that there are no intervening systems or equipment or other obstacle existing in the path of the signals that would significantly affect the characteristics of the signals traveling from a first point to a second point or from an origin point to a destination point.

In another embodiment of the present disclosure, the 3D imaging sensor comprises a transmitter, a receiver, and an array coupled to the transmitter and receiver, said array having one or more energy emitter elements and energy detector elements wherein the array is configured to emit a transmit signal generated by the transmitter.

In such embodiment, the transmit signal comprises a digitally beam formed orthogonal digital waveform modulated by a multiple input multiple output (MIMO) processed frequency domain PN sequence, said digitally beam formed orthogonal digital waveform is converted to an analog waveform signal caused to modulate an energy source resulting in a modulated signal (i.e., the modulated energy) that is then analog beam formed to obtain the transmit signal applied to the one or more energy emitter elements of the array.

The operation of analog beam forming comprises applying a signal directly to an element of the array to provide a certain phase to the element. The phase of that element does not change until the signal (e.g., voltage, current) is no longer applied.

Continuing with this embodiment, the receiver is configured to perform operations using computational imaging comprising at least an image formation algorithm to generate 3D images of a scene being illuminated by the 3D imaging sensor of the present disclosure. The image formation algorithm first makes adjustments to resultant phase shift experienced by signals transmitted from the 3D imaging sensor and reflected or backscattered by the scene. Further, the image formation algorithm performs a 2D FFT of the reflectivity density of the reflected signals (from the scene) to generate a 3D image of the scene.

FIG. 1A illustrates an example advanced radio system including a 3D imaging sensor 100 according to embodiments of the present disclosure. The embodiment of the 3D imaging sensor 100 illustrated in FIG. 1A is for illustration only. FIG. 1A does not limit the scope of this disclosure to any particular implementation. As illustrated in FIG. 1A, the advanced radio system may be an electronic device to transmit and receive signal, and perform a sensing function using 3D and/or 2D. FIG. 1A does not limit the scope of the present disclosure to any particular implementation of an electronic device.

Referring to FIG. 1A, the present disclosure provides an advanced radio system including (e.g., electronic device) a three-dimensional (3D) imaging sensor 100, that uses image formation algorithms to generate 3D images of objects. The object(s) as shown are assumed to be in the field implying a certain distance from an emitter/detector array 106 to the scene. The 3D imaging sensor comprises a digital imaging circuit 102 coupled to a transceiver (XCVR) 104, which is coupled to an array 106 having one or more energy emitter elements and one or more energy detector elements. The 3D imaging sensor 100 has a transmit path starting from the digital imaging circuit 102 extending through the transceiver circuit 104 to the array 106, and a receive path starting from the array 106 extending through the transceiver circuit 104 to the digital imaging circuit 102.

The 3D imaging sensor generates a transmit signal that is emitted by the energy emitter elements (not shown in FIG. 1A) of the array 106. The 3D imaging sensor then detects the transmit signal reflected from objects within a field of view (FoV) allowing to generate 3D images of the objects using at least an image formation algorithm for making adjustments to a resultant phase shift experienced by the reflected transmit signals.

The image formation algorithm generates 3D images of the objects by performing a 2D FFT operation on the reflectivity density of the reflected transmitted signal. The adjustments affect at least one of phase shifts, time delay shifts, or frequency shifts due to Doppler, experienced by the reflected or backscattered transmit signal. Thus, the reflected or backscattered transmit signal experiences a resultant phase shift from a combination of the time delays, frequency shifts, and other phase shifts.

In one embodiment, the transmit path within the digital imaging circuit 102 comprises a sequence generator 102A for generating PN sequences, a waveform generator 102B for generating orthogonal digital waveforms and a digital transmit beam former 102C for performing digital beam forming operations on PN-sequence-modulated orthogonal digital waveforms. The digitally beam formed PN sequence modulated orthogonal digital waveforms are applied to digital to analog converter (DAC) 104B.

Still referring to FIG. 1A, the transmit path continues in the transceiver (XCVR) 104 comprising DAC 104B, and a modulator 104C wherein the modulator 104C has a first input coupled to an energy source 104A, and a second input for receiving an analog signal from the DAC 104B wherein said analog signal comprises the PN sequence modulated orthogonal digital waveform converted to an analog signal. The Modulator 104C further has an output providing a transmit signal that is coupled to one or more energy emitter elements of the array 106. The transmit signal is the energy modulated in accordance with the analog signal (i.e., the PN sequence modulated orthogonal digital waveform converted to an analog signal by the DAC 104B).

In one embodiment, the receive path of the transceiver 104 comprises an energy detector circuit 104E configured to receive and sum energy detected by one or more energy detector elements of the array 106. In particular, the receive path detects energy transmitted from the transmit path that is reflected (or backscattered) from objects in the FoV of the 3D imaging sensor of the present disclosure. The objects are in a distance from the 3D imaging processor 100 of FIG. 1A.

The energy detector circuit 104E is coupled to the energy detector elements (not shown) of the array 106. The energy detector circuit 104E also performs the operation of demodulating the received signal to a base baseband signal. The output of the energy detector circuit 104E is a received baseband signal, which is applied to an analog to digital converter (ADC) 104D for providing a received baseband digital signal to the digital image circuit 102. The receive path continues to the digital image circuit 102, which comprises a computational imaging circuit 102E coupled to a coherent detector 102D (i.e., a correlation detector) to detect coordinates of volume pixels (voxels) used to generate 3D images of the objects.

The computational imaging circuit 102E performs at least one image formation algorithm for making adjustments to phase shifts (or a resultant phase shift) experienced by received signals originally transmitted by the transmitter of the 3D imaging sensor. The at least one image formation algorithm uses the reflectivity density of the reflected signals to generate 3D images of objects in the field-of-view being illuminated by the transmitter of the 3D imaging processor of the present disclosure.

It will be understood that all of the circuitry and/or modules shown in FIG. 1A, including circuit 108 comprising a tracking circuit 108A and a post processing circuit 108B are controlled, directed or otherwise operated by a processor 110. A post processing circuit 108B performs operations to improve the quality of the obtained image. Any discovered distortions in the obtained image are corrected or removed to improve the quality of the 3D image obtained by the image sensor of the present disclosure.

It will be readily understood that any of the modules and/or circuits in the digital imaging circuit 102 or the XCVR circuit 104 may be part of the memory of the processor 110 to allow the processor to control, perform or direct any and all operations performed by one or more of the circuits 102A-E, 104A-E, and 108A-B. The processor 110 may operate as a digital signal processor or a microprocessor or both. The processor 110 may configure the signal format described in FIG. 1B in accordance with a configuration condition. The configuration condition may be targeted distance, noise and interference level, or the performance requirements.

The tracking circuit 108A serves as a storage unit for the targets detected by the coherent detector circuit in 102D where the output of the coherent detector circuit 102D in FIG. 1A (or in circuits 242, 244, and 246 of FIG. 2) is compared to a threshold where the threshold may be set based on a constant false-alarm rate (CFAR) criterion. According to CFAR criterion, a threshold is determined based on the signal statistics; typically, the mean and the variance of the channel through which the signals traverse. The obtained images and various versions of the same image may be further processed if needed. The post processing circuit 108B monitors the quality of the demodulated baseband signal or the quality of the image generated from the digital circuit 102 to determine if the type of processing being performed needs to be adjusted to obtain improved signal quality.

For example, the post processing circuit 108B can be designed and configured to detect when interference from other signals, including signals from other 3D imaging sensors, occur. When an interference is detected by the post processing circuit 108B, the processor 110 can operate or cause a sequence generator 102A to generate a different type of sequence or different type of combination of sequences to reduce the probability of interference between different users of 3D imaging sensors.

For example, the sequence generator 102A can be designed and/or configured to generate PN sequences (or other sequences) having different formats. The sequences can be assigned randomly, follow a pre-determined pattern, or can be changed adaptively depending on the measured interference level. After CFAR detection by a threshold test, a radar tracking algorithm initiates target tracking. Well-known algorithms such as Kalman filter is used to track multiple targets based on position and the velocity of the target.

Figure 1B:
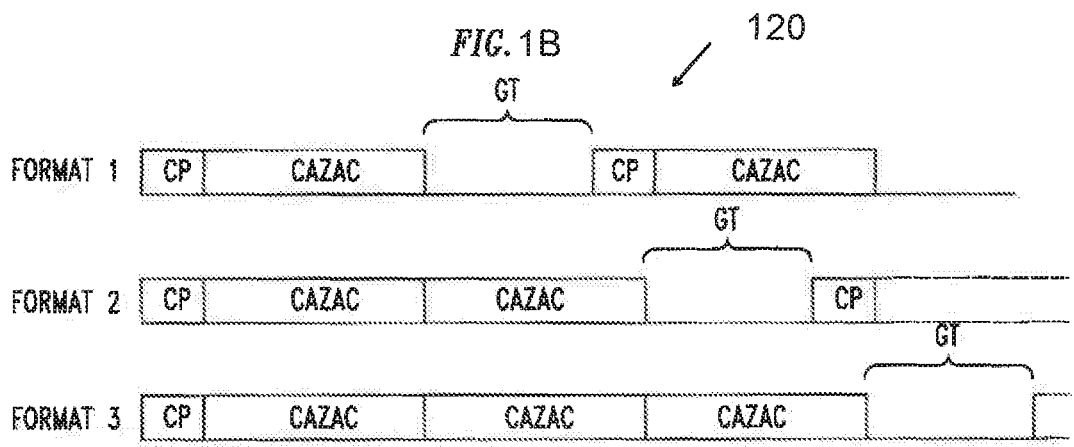
FIG. 1B illustrates examples three different types of PN sequence formats that can be used by a transmitter of 3D imaging sensor according to embodiments of the present disclosure.

FIG. 1B illustrates examples three different types of PN sequence formats 120 that can be used by a transmitter of 3D imaging sensor according to embodiments of the present disclosure. The embodiment of the three different types of PN sequence formats 120 illustrated in FIG. 1B is for illustration only. FIG. 1B does not limit the scope of this disclosure to any particular implementation.

Figure 1C:
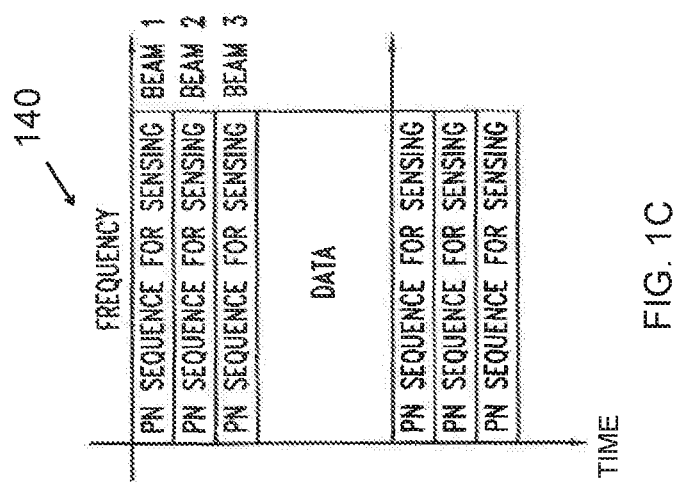
FIG. 1C illustrates an example 3D imaging sensor within a time-frequency multiplexing scheme of a communication system according to embodiments of the present disclosure.

FIG. 1C illustrates an example 3D imaging sensor 140 within a time-frequency multiplexing scheme of a communication system according to embodiments of the present disclosure. The embodiment of the 3D imaging sensor 140 illustrated in FIG. 1C is for illustration only. FIG. 1C does not limit the scope of this disclosure to any particular implementation.

Figure 1D:
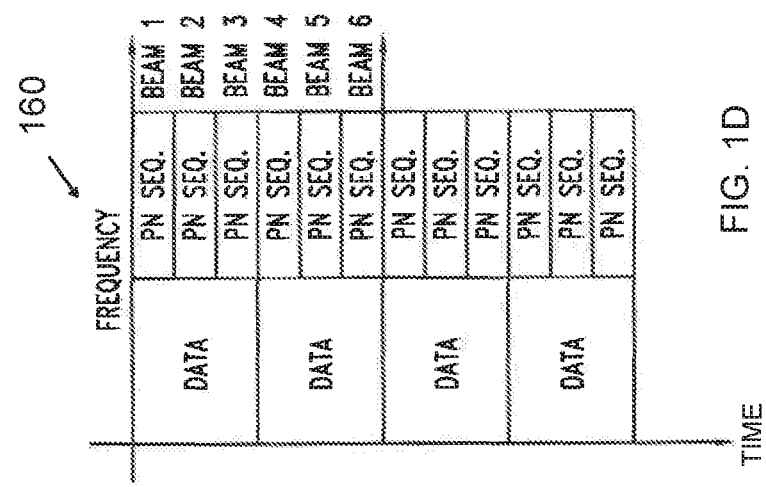
FIG. 1D illustrates an example multiplexing scheme according to embodiment of the present disclosure.

FIG. 1D illustrates an example multiplexing scheme 160 according to embodiment of the present disclosure. The embodiment of the multiplexing scheme 160 illustrated in FIG. 1D is for illustration only. FIG. 1D does not limit the scope of this disclosure to any particular implementation. As illustrated in FIG. 1D, data (e.g., user date to be transmitted to a receiver) is generated and multiplexed by at least one PN sequences. An electronic device (as illustrated in FIG. 1A, e.g., radio system) may map the date multiplexed by the at least one PN sequence into at least one transmit beam.

Referring temporarily to FIG. 1B three different formats for the PN sequences are shown. The formats show 1, 2 or 3 constant amplitude zero autocorrelation (CAZAC) sequence blocks followed by a guard time. In particular format 1 has one CAZAC sequence block followed by a guard time. A Format 2 has two CAZAC sequence blocks followed by a guard time. A Format 3 has three CAZAC sequence blocks followed by a guard time. The sequences repeat after a guard time. The guard time refers to a time period during which the sequence generator—after having transmitted one or more (consecutive) sequence blocks (depending on the format being used)—does not transmit any sequence blocks during a defined time period called the guard time. As illustrated in FIG. 1B, the guard time may be added as an optional time span to generate the CAZAC sequence.

To reduce or eliminate interference with other image sensors, the processor 110 may cause sequence generator 102A (of FIG. 1A) to use the sequence of a different format. Further, a normal operation of the 3D imaging sensor of the present disclosure may be configured to perform sequence hopping whereby the 3D imaging sensor generates different formats in a pseudo-random manner or some manners that do not use the same format all the time or even the same format consecutively.

Referring back to FIG. 1A, the processor 110 comprises microprocessors, microcontrollers, a master processor in control of one or a multiple of processors including digital signal processors (DSP), or processors implemented as or are part of field programmable gate arrays (FPGA), application specific integrated circuits (ASICs) or other similar circuitry. Further, the processor 110 may reside on a circuit board that forms part of the image sensor or the processor may be remotely located while still being able to operate, control or otherwise direct any of the modules and/or circuit of FIG. 1. It will be readily understood that some or all of the modules and/or circuit referred herein with respect to 3D an imaging sensor 100 (discussed supra), and the imaging sensor 200 (discussed infra) are implementable, at least in part, using any of these various implementations of the processor 110.

FIG. 2A illustrates an example 3D imaging sensor 200 according to embodiment of the present disclosure. The embodiment of the 3D imaging sensor 200 illustrated in FIG. 2A is for illustration only. FIG. 2A does not limit the scope of this disclosure to any particular implementation.

Referring now to FIG. 2A, there is shown another embodiment of the present disclosure. Although not shown, the embodiment of FIG. 2A may also be operated, controlled or otherwise directed by a processor in a similar fashion as the embodiment of FIG. 1A. That is, the processor controlling of the embodiment of FIG. 2A comprises microprocessors, microcontrollers, a master processor in control of one or a multiple of processors including a digital signal processors (DSP), or processors implemented as or are part of FPGAs, an application specific integrated circuits (ASICs) or other similar circuitry. Further, the processor may reside on a circuit board that forms part of the image sensor or the processor may be remotely located while still being able to operate, control or otherwise direct any of the circuits of FIG. 2A.

In the embodiment of FIG. 2A, the 3D imaging sensor 200 comprises a transmitter (circuits 202 to 224A inclusive), a receiver (circuits 224B to 252 inclusive), and an array 226 coupled to the transmitter and receiver, with said array 226 having one or more energy emitter elements and one or more energy detector elements wherein the array 226 is configured to emit a transmit signal generated by the transmitter.

The array 226 of FIG. 2A as well as the array 106 of FIG. 1A are configured to emit energy in various frequency bands (or frequency regions) and/or wavelength ranges. For example, the array 226 of FIG. 2A or the array 106 of FIG. 1A is configured to emit or detect optical signals in the wavelength range of 700 nm to 1400 nm inclusive belonging to near infrared (NIR) and 1400 nm to 3000 nm inclusive belonging to short-wave infrared (SWIR). Also, both arrays (226, and 106) are configured to emit or detect electromagnetic signals in one of a High Frequency (HF) region or band, a Very High Frequency (VHF) region, a Ultra High Frequency (UHF), a Super High Frequency (SHF) band, an Extremely High Frequency (EHF) region and a Tera Hertz (TH) region. The EHF region is particularly suited for simultaneous broad band communications and high-resolution imaging. The terms "frequency region" and "frequency band" are used interchangeably.

FIG. 2B illustrates an example front view of an array 250 according to embodiments of the present disclosure. The embodiment of the front view of an array 250 illustrated in FIG. 2B is for illustration only. FIG. 2B does not limit the scope of this disclosure to any particular implementation.

The front view of the array 226 is shown in FIG. 2B depicting the array 226 comprising four (4) sub-arrays 226A, 226B, 226C, and 226D. In general, the array 226 may be subdivided into any number of sub-arrays where each sub-array comprises a certain number of array elements. Each sub-array may have the same number of array energy emitter elements and energy detector elements. Also, certain sub-arrays may have different number of elements depending on the location of said sub-arrays within the entire array. For example, a sub-array located at or near the center of the array may have more array elements than any other sub-arrays.

The transmit signal comprises a digitally beam formed orthogonal digital waveform (output of digital beam former TX 216). Prior to being digitally beam formed, the orthogonal digital waveform is generated by the combination of resource element (RE) mapping circuit $212_1, \ldots, 212_L$ coupled to corresponding inverse fast Fourier transform (IFFT) cyclic prefix (CP) circuits $214_1, \ldots, 214_L$. Also, said orthogonal digital waveform is modulated by a MIMO processed frequency domain PN sequence (i.e., output of MIMO pre-coding circuit 210).

Thus, the digitally beam formed orthogonal digital waveform is obtained by applying the orthogonal digital waveform to the digital beam former 216. The digitally beam formed orthogonal digital waveform is converted to an analog waveform by DAC 218 (i.e., signal at output of DAC 218). The resulting analog waveform is applied to an input of modulator 222 to modulate an energy source 220 (applied to another input of modulator 222 as shown) resulting in a modulated analog signal that is analog beam formed by analog beam former 224A to obtain the transmit signal (output of analog beam former 224A) applied to the one or more energy emitter elements of the array. The one or more energy emitter elements of the array 226 thus emit the transmit signals applied to them.

The modulator 222 of FIG. 2A (as well as modulator 104C of FIG. 1A) may be configured as any one of the following: a binary phase shift keying (BPSK) modulator, a quadrature phase shift keying (QPSK) modulator, an on off keying (OOK) modulator, an amplitude shift keying (ASK) modulator, a frequency shift keying (FSK) modulator, a pulse position modulation (PPM), a phase shift keying (PSK) modulator, and a differential phase shift keying (DPSK) modulator.

Still referring to FIG. 2A, the manufacture of the transmit signal starts with PN sequence generator 202, which generates a time domain PN sequence: $S_0, S_1, S_2, \ldots, S_{N-1}$, which is transformed via discrete Fourier transform (DFT) circuit 204 to a frequency domain PN sequence: $X_0, X_1, X_2, \ldots, X_{N-1}$ as shown in FIG. 2A.

N is an integer equal to 1 or greater. The DFT circuit/module 204 performs a discrete Fourier transform on a time domain sequence to convert said sequence to a frequency domain sequence. A time domain PN sequence obtained from a CAZAC sequence is one example of a PN sequence that is generated by the PN sequence generator 202. A CAZAC sequence is a type of PN sequence having constant amplitude zero auto-correlation (CAZAC) property. The $u^{th}$ root of a Zadoff-Chu sequence, which is a CAZAC sequence, is given by the equation:

$$x_u(n) = e^{-\frac{\pi u n(n+1)}{N_{ZC}}},$$

$0 \leq n \leq N_{ZC}-1$ where $N_{ZC}$ is the length of the length of the Zadoff-Chu sequence. The frequency domain PN sequence is then MIMO processed.

Figure 3A:
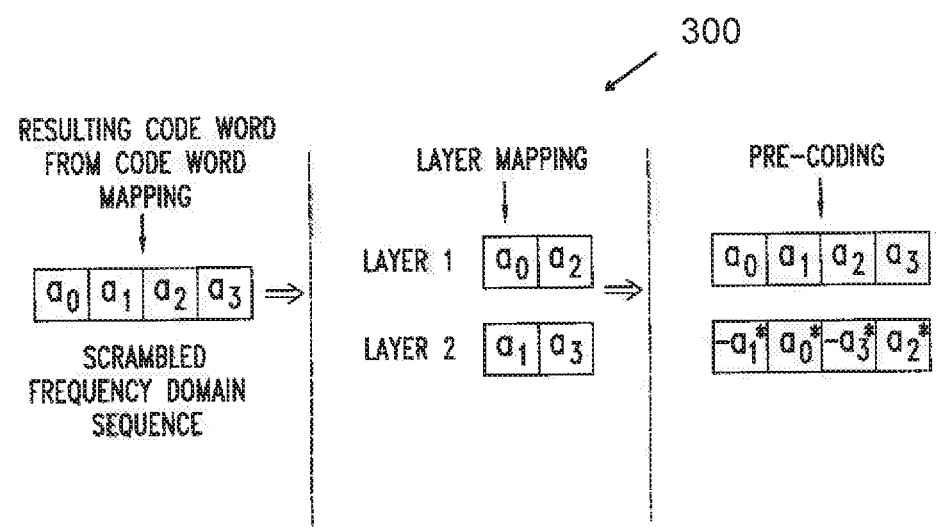
FIG. 3A illustrates an example 3D imaging including a digital beam former circuit according to embodiments of the present disclosure.

FIG. 3A illustrates an example 3D imaging 300 including a digital beam former circuit according to embodiments of the present disclosure. The embodiment of the 3D imaging 300 illustrated in FIG. 3A is for illustration only. FIG. 3A does not limit the scope of this disclosure to any particular implementation.

Referring to FIG. 3A, a graphical illustration showing examples of the operations performed in the MIMO processing is shown. The MIMO processing of the present disclosure comprises a first operation referred to as code word mapping followed by a second operation referred to as layer mapping, which is followed by a third operation referred to as pre-coding. In one example, a 4-element time domain sequence is assumed generated by a circuit such as the PN sequence generator 202 of FIG. 2A. The time domain sequence is converted to a frequency domain sequence via a discrete Fourier transform (DFT) circuit 204 of FIG. 2A. The operation of code word mapping is then performed on the frequency domain sequence.

Still referring to FIG. 3A, one example of the code word mapping is first adding checksum bits (such as cyclic redundancy codes or CRC bits) for error checking of the original block of bits. The resulting block may then be fragmented into code blocks, each of which may be processed by a coder (e.g., ⅓ turbo Coder). The resulting coded blocks are reassembled into a code word. For the layer mapping operation, the code word is further scrambled and is fragmented into blocks each of which is a layer.

Thus, for the layer mapping shown in FIG. 3A the frequency domain code word is shown as having four elements and 2 layers. The 4-element sequence block shown has already been scrambled as per any well-known scrambling scheme or any arbitrary scrambling scheme. The scrambling refers to re-arranging the time order of the sequence elements. An example of the pre-coding operation is then illustrated by FIG. 3A.

A MIMO processing is therefore performed on the frequency domain sequence by first performing a code word mapping operation (see circuit 206 of FIG. 2A) followed by a layer mapping operation (circuit 208 in FIGS. 2 and 3), which is followed by a MIMO pre-coding operation (see circuit 210 in FIGS. 2 and 3) collectively referred to herein as MIMO processing. In sum, the MIMO processing re-arranges sequence elements within a particular sequence block and separates the sequence block into portions assigned to particular layers and performs certain operations on the different layers.

Still referring to FIG. 3A, there is shown a graphical depiction of how the MIMO operations are performed on a sequence block. For clarity of explanation, the MIMO operations on one 4-element sequence block are shown. The code word mapping adds more elements to the sequence block to help a receiver determine whether an error occurred in the sequence block once received after having been transmitted. The code word mapping operation may also include scrambling of the sequence elements.

In one example, the 4-element sequence block shown under the code word mapping operation is assumed to have been subject to a code word mapping operation. The remainders of the MIMO operations are also shown. As shown the operation of layer mapping fragments the sequence into a number of layers (L, here L=2) after the order of the sequence elements has been altered (i.e., the sequence has been scrambled). The pre-coding operation follows whereby certain operations are performed on the sequence elements for certain layers and not for other layers.

Also, the pre-coding operation determines the particular subset of energy emitter elements (when transmitting a signal) and energy detector elements (when receiving a reflected signal) of the array 226 that are to be energized. In the example being discussed, for one of the L precoding layers, a complex conjugate operation on the scrambled sequence elements was performed. For the other layer, the sequence elements were scrambled but the sequence elements were not subjected to any other operation.

Referring back to FIG. 2A, the output of the pre-coding circuit 210 is used to modulate the resource element (RE) mapping and orthogonal waveform generation associated with the REs in generating, an orthogonal frequency division multiplexing (OFDM) digital waveform. An OFDM is one example of an acceptable orthogonal waveform that may be used in FIG. 2A. Other acceptable orthogonal waveforms comprise orthogonal or pseudo-orthogonal waveforms such as CP-less OFDM, filter bank multi-carrier (FMBC) waveforms, generalized frequency division multiplexing (GFDM) waveforms, and resource spread multiple access (RSMA) waveforms. It is in this manner that the frequency domain MIMO processed PN sequence is caused to modulate the orthogonal sequence.

As shown, the orthogonal sequence generated is a well-known orthogonal waveform (OFDM) whereby RE mapping (circuits $212_0$, $212_1$, ..., $212_L$) followed by an cyclic prefix IFFT (circuits $214_1$, $214_2$, ..., $214_L$) for each of the L layers are performed; L is an integer equal to 1 or greater.

The MIMO processed PN sequence modulated OFDM sequence is applied to a digital beam former 216, which combines phase adjusted orthogonal sequence elements in a manner consistent with the array energy emitter elements being used to emit a transmit signal in a certain direction. In addition to applying various phase shifts to the OFDM waveform, the digital beam former 216 is operated such that the proper energy emitting elements of array 226 are energized in accordance with a desired target within the FoV of the imaging sensor that is to be illuminated.

It is noted each of the layers L is associated with a particular energy emitting element or a particular group of energy emitting element of the array 226. The antenna array consists of multiple sub-arrays, each with phase shifts between the antenna elements of the sub-array. That is, the digital beam former 216 selects how much phase adjustment is to be made for each of the orthogonal sequence elements of the different layers corresponding to the antenna subarray. In this manner, certain particular energy emitter elements of the array will experience more phase change than others. Such phase mapping by DBF TX circuit 216 may affect the direction, size, shape, and amplitude of the beam illuminating a particular area of the FoV of the array 226.

The output of DBF TX circuit 216 is applied to DAC 218 whose output modulates energy source 220 via the modulator 222. The output of the modulator 222 is applied to an analog beam forming circuit 224A. the analog beam forming circuit 224A, controls the amount of energy to be applied to each of the energy emitting element of each of the L layers and provides a constant phase offset to each of the transmit signals being emitted by the array 226.

FIG. 3B illustrates an example MIMO processing of a frequency domain PN sequence 320 according to embodiments of the present disclosure. The embodiment of the MIMO processing of a frequency domain PN sequence 320 illustrated in FIG. 3B is for illustration only. FIG. 3B does not limit the scope of this disclosure to any particular implementation.

FIG. 3C illustrates an example digital beam former circuit 340 according to embodiments of the present disclosure. The embodiment of the digital beam former circuit 340 illustrated in FIG. 3C is for illustration only. FIG. 3C does not limit the scope of this disclosure to any particular implementation.

Referring to FIG. 3B, there is shown a more detailed arrangement of the digital beam former 216 and how the arrangement of the digital beam former 216 interfaces with the orthogonal waveform generator implemented with circuits 212 and 214. Also shown in FIG. 3C is the structure for each of the digital beam formers. Each beam former has B outputs each representing a beam; B is an integer equal to 1 or greater. Thus, each digital beam former $216_{1, ..., L}$ outputs data to generate B beams. A beam is unique combination of elements of M different sub-arrays as shown in the digital beam former of FIG. 3C; M is an integer equal to 1 or greater. There are L digital beam formers corresponding to the L layers generated from the layer mapping circuit 208. Each of the L layers is precoded resulting in L pre-coded layers each of which is applied to an RE mapping circuit each output of which is applied to an IFFT/CP circuit. Each combination of RE mapping circuit and IFFT/CP circuit represents a particular OFDM digital waveform. Thus, there is a combination of L RE mapping and IFFT/CP as shown.

Still referring to FIG. 3B and now FIG. 3C, a closer review of the architecture of each digital beam former follows. As shown in FIG. 3C, each digital beam former has an input that is coupled to B sub-array mappings each of which containing M phase shifts; there are L such digital beam formers as shown in FIG. 3B.

Thus, each of the L digital beam formers ($216_1$, $216_2$, ..., $216_L$) applies M unique phase shifts (i.e., $\phi$) to each of B sub-array mappings for L layers and uniquely combines these mappings to generate B beams. Consequently, there are L×B beams, each of which is converted to an analog signal by DAC $218_1$, $218_2$, ..., $218_L$ that is then applied to a modulator $222_1$, $222_2$, ..., $222_L$. As discussed above, L is the number of layers, B is the number of beams, and M is the number of phase shifts, $\phi$, per sub-array mapping. In general, the value of B×M does not exceed the total number of antenna elements in the array.

The outputs of the modulators are applied to an analog beam former 224A which is then coupled to one or more energy emitter elements of the array (not shown in FIG. 3B) 226. The analog beam former 224A applies a proper constant phase shift to the proper combination of analog emitter elements of the array 226. Thus, value of L is the number of layers generated by layer mapping circuit 208 of FIG. 2A. The values of M and B depend on the number of subarrays and the number of energy emitter elements that are included in the array 226 of FIG. 2B.

It should be noted, that communication systems that use OFDM, transmit data by multiplexing the data in both time and frequency. Thus, any transmission is specifically identified by the intersection of a defined time period and within a frequency band; see FIG. 1C and FIG. 1D for example. The transmission of a signal as per FIG. 2A and FIG. 1A of the present disclosure can be used in such OFDM systems by multiplexing the transmit signal of the Transmitter of the 3D imaging sensor described in FIGS. 1A, 1B, 2A, 3A, 3B, and 3C above in frequency and time as in OFDM multiplexing communication systems as shown in FIG. 1C and FIG. 1D.

The transmitted signal may be a PN sequence being used to sense the scenes and generate 3D images of such scenes through the use of an image formation algorithm as discussed throughout this disclosure. The PN sequence may be multiplexed such that consecutive PN sequences forming beams may be transmitted along with the data of the communication system as shown in FIG. 1C and FIG. 1D. In other embodiments the signal transmitted by the 3D imaging sensor of the present disclosure may be PN sequences combined with other types of sequences.

Referring back to FIG. 2A, the receive path of the 3D imaging sensor 200 is now discussed. Transmit energy that is reflected from an object is received by energy detector elements of array 226. It will be readily understood that other energy not originally transmitted by the 3D imaging sensor 200 may also detected by the array 226. Generally, energy falling within the energy band of operation of the array 226 (i.e., frequency band, or wavelength band) is detected by the array 226 which transfers such energy analog beam former (ABF) 224B. The beam former 224B applies a constant phase shift to received signals. The constant phase shift applied to received signals by ABF 224B is equal to the phase shift applied to transmit signals by ABF 224A.

The received signal, after having been beam formed by ABF 224B, is applied to an energy detector and demodulator circuit 228 which stores a sum of the energy received and demodulates the received signal to a baseband signal taking into account the relative speed, v, between the 3D imaging sensor of the present disclosure and the scene being illuminated by the 3D imaging sensor.

The circuit 228 performs the operations of received signal energy detection and demodulation. The received signal may be a signal transmitted by the 3D imaging sensor and is reflected by an object, structure or other item in a scene. The demodulation uses a local signal having frequency $f_0$, which is equal to the carrier frequency of the signal transmitted by the 3D imaging sensor 200 to illuminate a scene in a from the 3D imaging sensor.

The local signal is shown being applied to the circuit 228, but more particularly said local signal is being applied to the demodulator portion of the circuit 228. Variables of the mathematical expression for the local signal include c, which is the speed of light, t, which stands for time and v, which is the velocity at which a scene is moving relative to the imaging sensor of the present disclosure (or the velocity at which the sensor is moving relative to the scene). The output of the circuit 228 is an analog baseband signal that is converted to a digital form by the ADC 230, which transfers said digital signal to a computational imaging circuit 232.

The computational imaging circuit 232 performs at least an image formation algorithm for making adjustments to the resultant phase shift experienced by transmitted signals (transmitted by the 3D imaging sensor of the present disclosure) reflected or backscattered from objects, structures or items of a scene. The image formation algorithm also generates voxels for generating 3D images of objects, structures or other items being illuminated (with transmit signals) by the transmitter of the 3D imaging sensor of the present disclosure. The transmit signals are reflected or backscattered by the objects, structure or other items.

Figure 4:
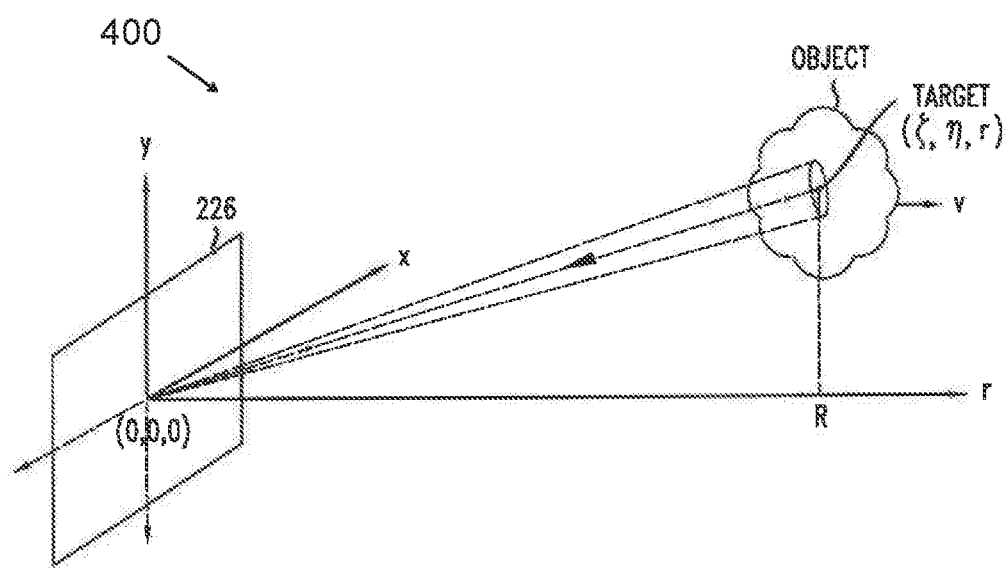
FIG. 4 illustrates an example object reflecting a signal back to an array of 3D imaging sensor according to embodiments of the present disclosure.

FIG. 4 illustrates an example object reflecting a signal back to an array of 3D imaging sensor 400 according to embodiments of the present disclosure. The embodiment of the object reflecting a signal back to an array of 3D imaging sensor 400 illustrated in FIG. 4 is for illustration only. FIG. 4 does not limit the scope of this disclosure to any particular implementation.

Referring to FIG. 4, there is shown a target of an object located a distance r from the array 226 of the 3D imaging sensor of the present disclosure where r=R. For ease of description, suppose a signal transmitted from the 3D imaging sensor (only the array 226 is shown in FIG. 4) is being reflected by a point in the target shown having coordinates ($\zeta$, $\eta$, R) where r=R of an object located a distance of R away from the array 226.

Although not shown, it is understood that the signal being reflected (or backscattered) by the object shown in FIG. 4 is originally emitted by one or more energy emitter elements of the array 226 and is reflected by the object in FIG. 4 (in the direction shown by the arrow in FIG. 4) from the target point to an energy detector element located at coordinates (0, 0, 0). An x-y-r Cartesian coordinate system is superimposed onto the array 226 (of the 3D imaging sensor) and the array 226 is aligned with the coordinate system such that the position of one of the energy detector elements receiving the reflected signal is located at point (0, 0, 0).

As shown in FIG. 4, the target being illuminated is at location where x=$\zeta$, y=$\eta$, and r=R. Even though the array element receiving the reflected or backscattered energy is able to properly detect the energy, the signal has probably experienced an overall phase shift (i.e., a resultant phase shift) due to frequency translation, time delay, and other well-known factors that ultimately affect the proper location attributed to the signal by the 3D imaging sensor of the present disclosure.

In particular, the transmit signal experiences time delays, frequency shifts and phase shifts. Without taking into account these various phase shifts, frequency shifts, and time delays, the resulting voxel would be calculated to a wrong location because of the resultant phase shift. This would result in the voxel (e.g., volume pixel) being placed at the wrong location in the 3D image being generated. A resulting image having one or more slightly misplaced voxels would be unclear, blurry and generally not sharp.

Consequently, the computational imaging circuit 232 (of FIG. 4) performs an image formation algorithm that provides for the necessary adjustments (i.e., phase correction) to be made to each of the voxels of a 3D image where the voxels are being generated by the 3D imaging sensor of the present disclosure through the use of a 2-D FFT (circuit 234) of the reflectivity density of the signals reflected or backscattered from the object. Thus, the image formation algorithm performs a phase adjustment (or phase correction) to the resultant phase shift experienced by these reflected or backscattered signals Each of the transmit signals emitted by an emitter element of the array 226, after having been reflected or backscattered, experiences a resultant phase shift depending on the range, R. The range is the distance from the array emitter element to the target being illuminated. Thus, the range is a function of the location of the array emitter element emitting the transmit signal. The round-trip time for each of the transmit signals is estimated using coherent processing. As can be seen in FIG. 2A, the transmit signal is originally a PN sequence that is transmitted and is then reflected and detected through the use of coherent processing using the circuit 236 of FIG. 2A. The round-trip time is converted to a range value, R, (by circuits 242, 244, and 246) for each voxel thus generating a 3D image.

For a 2D array or for a 1D array that operates as a virtual 2D array, the location can be expressed in terms of an (x, y) coordinate system. The range R can be expressed in terms of the target location r(S) where S represents the emitter element position.

The resultant phase shift experienced by the reflected or backscattered transmit signal and therefore the phase correction that is to be made to the reflected transmit signal is given by the following formula:

$$C(S) = e^{-j\frac{2\pi}{\lambda R}2r(S)}$$

where λ is the wavelength of the reflected transmit signal.

The computational imaging performed by the circuit 232 applies a phase correction whose value is calculated using C(S). The phase correction is the inverse of the resultant phase shift experienced by the transmit signal. Multiple factors contribute to the resultant phase shift experienced by each transmit signal. For example, the resultant phase shift can be the result of any one or any combination of frequency translation, time delay and actual phase shift experienced by the transmit signal.

The computation of C(S) is simplified when the object being illuminated by the 3D imaging sensor of the present disclosure is located in the "far field" of the array. As will be explained infra, a "far field" target is located at a distance r that meets certain requirements. For ease of description, it is assumed that the transmit and receive arrays are the same, but this is not a requirement for the image formation algorithm. As long as the geometry of the transmit and receive arrays are known, this "far field" calculation can also be used for co-located or non-co-located transmit-receive arrays.

The object and a reflection of a signal to the array 226 is shown in FIG. 4. Suppose, for ease of description, the reflected energy is detected by an energy detector element located at (0, 0, 0). Consider a target point located at location (ζ, η) at a particular instant in time, t, and traveling at relative velocity of y in the direction of r as shown.

The reflectivity density of the target point can be modeled as ρ(ζ, η, R). The reflectivity density is the reflection of the signal from the target point per infinitesimal volume dζdηdr. Thus, the reflectivity density is the entire 3D region where an object target point is located. To calculate the reflectivity density for all reflections in the area around the target point, a triple or 3D integral of the signal from all reflections in the volume occupied by the target point is performed. The transmit signal (originating from the transmitter of the 3D imaging sensor having the array 226) is modeled as $S(t)=e^{j2\pi(f_0 t + \phi_0)}$, $0 \le t \le T_P$ where $f_0$ is the carrier frequency of the transmit signal, $\phi_0$ is a constant phase offset, and $T_S$ is the time duration of the transmit signal.

For simplicity of description and for a simpler derivation, the constant phase offset $\phi_0$ is assumed to equal to 0; i.e., $\phi_0=0$.

The return signal from the target at (ζ, η, R) for a particular instant of time, t, is obtained as:

$$dS_R(x, y, t) = \rho(\zeta, \eta, R)e^{j2\pi[f_0(t-\frac{2r}{c})+\phi_0]}d\zeta d\eta \quad \text{(Equation 1)}$$

where $r=\sqrt{(x-\zeta)^2+(y-\eta)^2+(R+vt)^2}$ is the distance from the array 226 to the target. Thus, as seen in the above equation for r, r is a function of several variables (including x, y, ζ, η), i.e., a function of transmitter element coordinates and target point coordinates. In the far field where $R_2 >> (vt)^2 + (x-\zeta)^2+(y-\eta)^2$, r can be approximated as $$r = R\left[1 + \frac{vt}{R^2} - \frac{x\zeta}{R^2} - \frac{y\eta}{R^2}\right]$$

and c is the speed of light. The term "far field" thus means that the distance R satisfies the relationship $R^2 >> (vt)^2 + (x-\zeta)^2+(y-\eta)^2$.

Equation (1) can be written as $$S_R(x, y, t) = \int\int_{-\infty}^{\infty} \rho(\zeta, \eta, R)e^{-2\pi f_0 \frac{2R}{c}} e^{j2\pi f_0(1-\frac{2v}{c})t} e^{-2\pi f_0 \frac{2(x\zeta+y\eta)}{c}} d\zeta d\eta,$$

which is a scaled version of the Fourier Transform of the reflectivity density ρ(ζ, η, R), i.e., $$S_R(x, y; t) = e^{-j2\pi\frac{2R}{\lambda}} e^{j2\pi f_0(1-\frac{2v}{c})t} \quad \text{(Equation 2)}$$

$$\int\int_{-\infty}^{\infty} \rho(\zeta, \eta, R)e^{-2\pi f_0 \frac{2(x\zeta+y\eta)}{c}} d\zeta d\eta =$$

$$e^{-j2\pi\frac{2R}{\lambda}} e^{j2\pi f_0(1-\frac{2v}{c})t} P\left(\frac{2x}{\lambda R}, \frac{2y}{\lambda R}\right)$$

P is a notation for the Fourier transform of the reflectivity density and λ is the wavelength of the signal. Thus, as shown in equation 2, the image at distance R is obtained by demodulating the received signal (using the circuit 228 of FIG. 2A), multiplying the received signal (i.e., the backscattered or reflected signal) by $$e^{+j2\pi\frac{2R}{\lambda}}$$

(using the circuit 232 having multiplier 232A of FIG. 2A) to make the phase adjustments to a reflected (or backscattered) signal having a range R, and by taking the 2D Fourier transform of the received signal to generate the voxel for a particular target point of an object located in the far field.

Referring back to FIG. 2A, the output of the circuit 232 is coupled to 2D FFT circuit 234, which performs a 2-dimensional FFT operation based on the double integral of Equation 2. The output of the circuit 234 is coupled to the multiplier 236 of the receiver path of the 3D imaging sensor of the present disclosure. The circuit 236 is part of a correlation receiver for determining the range R (i.e., distance where r=R). The circuit 232 performs the proper adjustments to the resultant phase shift experienced by the reflected transmit signal being received by one or more energy detector elements of the array 226. The adjustments made to the received reflected transmit signal at least reduce or eliminate the resultant phase shift experienced by such reflected (or backscattered) signal.

The output of the circuit 232 is transferred to 2D FFT circuit 234 converting said time domain received signal to the frequency domain allowing frequency domain coherent detection of said received signal with the use of pre-stored time domain sequence in a lookup table 252 converted to a frequency domain sequence by the DFT circuit 240. The time domain sequence in the lookup table 252 is the same time domain sequence used to construct the transmit signal that is now reflected (or backscattered) from an object in the field-of-view.

A complex conjugate circuit 238 performs the complex conjugate operation on the frequency domain version of the sequence from the DFT circuit 240 to allow coherent detection with the use of multiplier 236 (multiplying two frequency domain sequences). The output of the multiplier 236 is then converted to the time domain by the IFFT circuit 242 to obtain a magnitude of the range R or squared magnitude of R (e.g., the circuit 244) for the received transmit signal and for the adjustments to be made to the (x, y) coordinates of the energy detector array element that received the reflected (or backscattered) transmit signal.

The detected magnitude of the signal is then compared to a threshold by the threshold circuit 246 to determine the reflectivity density and the range value, r, (e.g., r=R) to the object from the received signal. The threshold is set such that false alarm probability of the object is maintained statistically, to avoid false positive images. The location (in x, y coordinates) and distance, r, from the transmit point are thus known.

A tracking circuit 250 serves as a storage unit for the targets detected by the circuits 242, 244, and 246, where the threshold may be set based on constant false-alarm rate (CFAR) criterion and the obtained images and stored various versions of the same image for further processing if needed. A post processing circuit 248 monitors the quality of the demodulated baseband signal from the computational imaging circuit 232 to determine if the type of processing being performed needs to be adjusted to obtain improved signal quality.

In one example, the post processing circuit 248 can be designed and configured to detect when interference from other signals including signals from other 3D imaging sensors occur. When an interference is detected by the post processing circuit 248, the processor (not shown in FIG. 2A) controlling, operating or otherwise directing the 3D imaging sensor of FIG. 2A can operate or cause the sequence generator 202 to generate a different type of sequence or different type of combination of sequences to reduce the probability of interference between different users of 3D imaging sensors.

In one example, the sequence generator 202 can be designed and/or configured to generate PN sequences (or other sequences) having different formats. The sequence can be assigned randomly, follow a pre-determined pattern, or can be changed adaptively depending on the measured interference level.

FIG. 5 illustrates a flow chart of a method 500 for generating 3D image of scene including objects and structures being illuminated by the 3D imaging sensor according to embodiments of the present disclosure. The embodiment of the method 500 illustrated in FIG. 5 is for illustration only. FIG. 5 does not limit the scope of this disclosure to any particular implementation.

Referring now to FIG. 5, there is shown a flow chart of the method of the present disclosure. The flow chart depicted in FIG. 5 shows how the steps of a 3D imaging sensor of the present disclosure are performed by the various circuits and modules depicted in FIGS. 1A and 2A. Even though FIG. 2A does not depict a processor as shown in FIG. 1A, it is readily understood that the embodiment of FIG. 2A comprises not only the circuits and/or modules and array shown, but also a processor similar in configuration to the processor 110 of FIG. 1A. The processor of FIG. 2A (not shown) may control, operate or direct the operation of the various modules, circuits and array 226 of the 3D imaging sensor of FIG. 2A. The processor 110 may configure the signal format described in FIG. 1B in accordance with a configuration condition. The configuration condition may be targeted distance, noise and interference level, or the performance requirements.

Similarly, the processor 110 of FIG. 1A may control, operate or direct the operation of the various circuits and/or modules, circuits and array 106 of the 3D imaging sensor of FIG. 1A. The steps performed in the method of FIG. 5 are performed by the processor, the circuits and/or modules or a combination of the processor and the modules and circuits depicted in FIG. 1A or FIG. 2A.

In step 500 of the method performed by the 3D imaging sensor of the present disclosure, a PN modulated MIMO processed digital waveform is generated. The PN sequence generator circuit 202 has stored therein various formats for PN sequences. One example of a PN sequence is the Zadoff-Chu sequence discussed supra. The Zadoff-Chu sequence is a constant amplitude zero autocorrelation (CA-ZAC) type of sequence and various formats of the Zadoff-Chu sequence can be stored in the sequence generator 202 of FIG. 2A or 102A of FIG. 1A. The Zadoff-Chu sequence generator circuits of FIGS. 1A and 2A have stored therein time domain sequences.

A discrete Fourier transform (DFT) of the time domain sequence is performed to generate a frequency domain PN sequence. As shown in FIG. 2A, the output of time domain PN 202 is applied to the DFT circuit 204 to perform the DFT operation resulting in a frequency domain PN sequence.

The output of DFT 204 is applied to the MIMO processing circuits. The MIMO processing operations comprise codeword mapping (the circuit 206) followed by a layer mapping (the circuit 208) and precoding (the circuit 210). The output of circuit 210 is thus a PN sequence modulated MIMO processed digital waveform.

In step 502, the PN sequence modulated MIMO processed digital waveform is applied to an orthogonal sequence generator. The orthogonal sequence generator shown in FIG. 2A is an OFDM sequence generator. The OFDM sequence generator comprises RE mapping circuits ($212_1$, $212_2$, ..., $212_L$) coupled to IFFT/CP circuits ($214_1$, $214_2$, ..., $214_L$) as shown in FIG. 2A. Various other types of orthogonal digital sequence generators or pseudo orthogonal sequence generators may be used as discussed supra.

In one example, such orthogonal digital waveform generators comprise orthogonal CP-less OFDM, filter bank multi-carrier (FBMC) waveform generators, generalized frequency division multiplexing (GFDM) waveform generators, and resource spread multiple access (RSMA) waveform generators.

The generated orthogonal digital waveform is modulated by the PN sequence modulated and MIMO processed digital waveform from the MIMO processing output (i.e., from output of pre-coding circuit 210 of FIG. 2A), and such orthogonal digital waveform is applied to digital Beamformer (i.e., the circuit 216 of FIG. 2A) resulting in a digitally beam formed digital waveform. In another embodiment, the MIMO processing output (i.e., output of pre-coding circuit 210 of FIG. 2A) is applied directly to digital beam former circuit 216 without the use of an orthogonal digital waveform; the digitally beam formed digital waveform for this embodiment does not use an orthogonal sequence.

In step 504, the digitally beam formed digital waveform is used at an input of a modulator (e.g., modulator 222 of FIG. 2A or modulator 104C of FIG. 1A). The other input of the modulator is coupled to an energy source. The resulting output of the modulator is the energy from the energy source being modulated in accordance with the digitally beam formed signal resulting in a transmit signal. It should be noted that the transmit signal may or may not have an orthogonal digital waveform component.

In one embodiment, the PN sequence modulated and MIMO processed digital waveform may be applied directly to a digital beam former instead of being applied first to an orthogonal digital waveform generator (i.e., an orthogonal sequence generator). In another embodiment, for both FIGS. 1A and 2A, the digitally beam formed orthogonal signal is converted to an analog signal (by DAC 104B of FIG. 1A, or DAC 218 of FIG. 2A) prior to being applied to the modulator.

In step 506, the transmit signal is emitted by one or more energy emitter element of the array of the 3D imaging sensor of the present disclosure. The transmit signal may be analog beam formed prior to being emitted by the array. In one embodiment, the analog beam former applies a non-varying phase shift onto the transmit signal prior to emission. The 3D imaging sensor may be illuminating a scene in which case, the emitted transmit signal or at least a portion thereof may be backscattered or reflected back to the array of the 3D imaging sensor. The backscatter or reflection is due to objects or structures in the FoV of the array on which the emitted transmit signal impinges. The array receiving the reflected transmitted signal may be the same array used to emit the transmit signal or the array may be a separate array configured to detect energy in various frequency bands or wavelength ranges.

In step 508, the reflected or backscattered transmit signal is detected by the array, and in particular by at least one energy detector element of the array. The detecting array may be the same array used to emit the transmitted signal or the detecting array may be a separate array configured with energy detector elements. The reflected energy may be detected, and an analog beam formed by the 3D imaging sensor. The receiving analog beam former applies a non-varying phase shift to the received reflected transmit signal.

In step 510, the received signal is converted to a baseband signal form through a demodulation operation and then converted to a digital signal by ADC (e.g., ADC 230 of FIG. 2A). The circuit 232 performs an adjustment to the resultant phase shift experienced by reflected or backscattered transmit signals and the circuit 234 generates 3D images of the objects, structures or items from which the transmitted signals are reflected or backscattered.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An advanced communication system comprising:
   a processor; and
   a sensor comprising a digital circuit and a transceiver (XCVR), the digital circuit operably connected to the processor, the digital circuit configured to:
      generate a first signal including a polyphase sequence based on a configuration condition,
      apply a digital transmit beamforming to the generated first signal,
      map a multi input multi output (MIMO) codeword to the generated first signal that is transformed by the digital transmit beamforming, and
      generate at least one layer by applying layer mapping to the generated first signal that is mapped by the MIMO codeword; and
   the XCVR operably connected to the processor, the XCVR configured to:
      emit the first signal via an array, wherein the first signal is modulated by the XCVR before emitting via the array, and
      detect a second signal comprising at least portion of the emitted first signal that is reflected from at least one object illuminated by an imaging sensor,
   wherein the digital circuit is further configured to generate images based on the second signal.

2. The advanced communication system of claim 1, wherein the XCVR is further configured to:
   convert the first signal to an analog signal;
   modulate the converted first signal with an energy source;
   demodulate the detected second signal; and
   convert the detected second signal to a digital signal.

3. The advanced communication system of claim 1, wherein the digital circuit is further configured to convert the second signal to a computational image.

4. The advanced communication system of claim 1, wherein the processor is configured to:
   identify at least one pseudo-noise (PN) sequence for sensing the at least one object; and
   map the at least one PN sequence to at least one transmit beam in a frequency and time domain.

5. The advanced communication system of claim 1, wherein:
   the processor is configured to:
      generate user data,
      identify at least one PN sequence to transmit the user data, and
      multiplex the at least one PN sequence to the user data in a frequency and time domain, and
   the XCVR is further configured to transmit the user data multiplexed by the at least one PN sequence through at least one transmit beam.

6. The advanced communication system of claim 1, wherein the MIMO codeword is mapped before converting the first signal to an analog signal.

7. The advanced communication system of claim 1, wherein the processor is configured to:
   apply analog beamforming to the generated first signal that is applied by the digital transmit beamforming before emitting the first signal; and
   apply the analog beamforming to the detected second signal comprising the at least portion of the emitted first signal that is reflected from the at least one object.

8. The advanced communication system of claim 1, wherein the digital circuit is further configured to:
- multiply a phase value to the second signal to perform a phase shift, wherein the second signal is a converted signal; and
- generate an image of the at least one object by applying a two dimensional (2D) fast Fourier transform to the second signal that is multiplied by the phase value.

9. A method of an advanced communication system, the method comprising:
- generating a first signal including a polyphase sequence based on a configuration condition;
- applying a digital transmit beamforming to the generated first signal;
- mapping a multi input multi output (MIMO) codeword to the generated first signal that is transformed by the digital transmit beamforming;
- generating at least one layer by applying layer mapping to the generated first signal that is mapped by the MIMO codeword;
- emitting the first signal via an array, wherein the first signal is modulated before emitting via the array;
- detecting a second signal comprising at least portion of the emitted first signal that is reflected from at least one object illuminated by an imaging sensor; and
- generating images based on the second signal.

10. The method of claim 9, further comprising:
- converting the first signal to an analog signal;
- modulating the converted first signal with an energy source;
- demodulating the detected second signal; and
- converting the detected second signal to a digital signal.

11. The method of claim 9, further comprising converting the second signal to a computational image.

12. The method of claim 9, further comprising:
- identifying at least one pseudo-noise (PN) sequence for sensing the at least one object; and
- mapping the at least one PN sequence to at least one transmit beam in a frequency and time domain.

13. The method of claim 9, further comprising:
- generating user data;
- identifying at least one PN sequence to transmit the user data;
- multiplexing the at least one PN sequence to the user data in a frequency and time domain; and
- transmitting the user data multiplexed by the at least one PN sequence through at least one transmit beam.

14. The method of claim 9, wherein the MIMO codeword is mapped before converting the first signal to an analog signal.

15. The method of claim 9, further comprising:
- applying analog beamforming to the generated first signal that is applied by the digital transmit beamforming before emitting the first signal; and
- applying the analog beamforming to the detected second signal comprising the at least portion of the emitted first signal that is reflected from the at least one object.

16. The method of claim 9, further comprising:
- multiplying a phase value to the second signal to perform a phase shift, wherein the second signal is a converted signal; and
- generating an image of the at least one object by applying a two dimensional (2D) fast Fourier transform to the second signal that is multiplied by the phase value.

17. A non-transitory computer-readable medium comprising program code, that when executed by at least one processor, causes an electronic device to:
- generate a first signal including a polyphase sequence based on a configuration condition;
- apply a digital transmit beamforming to the generated first signal;
- map a multi input multi output (MIMO) codeword to the generated first signal that is transformed by the digital transmit beamforming;
- generate at least one layer by applying layer mapping to the generated first signal that is mapped by the MIMO codeword;
- emit the first signal via an array, wherein the first signal is modulated before emitting via the array;
- detect a second signal comprising at least portion of the emitted first signal that is reflected from at least one object illuminated by an imaging sensor; and
- generate images based on the second signal.

18. The non-transitory computer-readable medium of claim 17, further comprising program code, that when executed by the at least one processor, causes the electronic device to:
- identify at least one pseudo-noise (PN) sequence for sensing the at least one object; and
- map the at least one PN sequence to at least one transmit beam in a frequency and time domain.

* * * * *